United States Patent
Gupta

(10) Patent No.: US 12,045,322 B2
(45) Date of Patent: Jul. 23, 2024

(54) DEFENDING AGAINST SPECULATIVE EXECUTION EXPLOITS

(71) Applicant: Virsec Systems, Inc., San Jose, CA (US)

(72) Inventor: Satya V. Gupta, Dublin, CA (US)

(73) Assignee: Virsec System, Inc., San Jose, CA (US)

( * ) Notice: Subject to any disclaimer, the term of this patent is extended or adjusted under 35 U.S.C. 154(b) by 1028 days.

(21) Appl. No.: 16/960,960

(22) PCT Filed: Jan. 11, 2019

(86) PCT No.: PCT/US2019/013318
§ 371 (c)(1),
(2) Date: Jul. 9, 2020

(87) PCT Pub. No.: WO2019/140274
PCT Pub. Date: Jul. 18, 2019

(65) Prior Publication Data
US 2020/0372129 A1    Nov. 26, 2020

Related U.S. Application Data

(60) Provisional application No. 62/618,508, filed on Jan. 17, 2018, provisional application No. 62/616,786, filed on Jan. 12, 2018.

(51) Int. Cl.
G06F 21/12        (2013.01)
G06F 9/30         (2018.01)
(Continued)

(52) U.S. Cl.
CPC ........ G06F 21/121 (2013.01); G06F 9/30087 (2013.01); G06F 9/3842 (2013.01);
(Continued)

(58) Field of Classification Search
CPC ...... G06F 21/121; G06F 21/577; G06F 21/54; G06F 9/3861; G06F 9/30087
(Continued)

(56) References Cited

U.S. PATENT DOCUMENTS 6,898,696 B1 *  5/2005  Cheong .................. G06F 9/3863
                                                     712/228
8,402,541 B2 *  3/2013  Craioveanu ........... G06F 21/563
                                                     713/188
(Continued)

FOREIGN PATENT DOCUMENTS

WO    2017/218872 A1    12/2017
WO    2019/140274 A1    7/2019

OTHER PUBLICATIONS

Kevin Coogan, "Automatic Static Unpacking of Malware Binaries" 2009 (Year: 2009).*

(Continued)

*Primary Examiner* — Samson B Lemma
(74) *Attorney, Agent, or Firm* — Hamilton, Brook, Smith & Reynolds, P.C.

(57) ABSTRACT

Embodiments protect a computer application from being exploited by an attacker, while the application code is executed by a speculative execution engine having vulnerabilities. Embodiments are directed to systems that, prior to execution of the application by a speculative execution engine, locate a sequence of instructions of the application in which the speculative execution engine executes the instructions out of sequence. For example, the sequence of instructions may be an "if-then" code block. The systems determine a disposition that forces the speculative execution engine to execute the instructions in sequence. For example, the disposition may be adding a fence instruction to the sequence of instructions. During execution of the application code by the speculative execution engine, the systems (Continued)

change the sequence of instructions based on the disposition. The systems execute the changed sequence of instructions in place of the located sequence of instructions to prevent an attack on the application.

18 Claims, 18 Drawing Sheets

(51) Int. Cl.
  *G06F 9/38* (2018.01)
  *G06F 21/54* (2013.01)
  *G06F 21/57* (2013.01)
(52) U.S. Cl.
  CPC ............ *G06F 9/3861* (2013.01); *G06F 21/54* (2013.01); *G06F 21/577* (2013.01)
(58) Field of Classification Search
  USPC .......................................................... 726/26
  See application file for complete search history.

(56) References Cited

U.S. PATENT DOCUMENTS

| | | | |
|---|---|---|---|
| 9,058,492 | B1 | 6/2015 | Satish |
| 9,183,396 | B2* | 11/2015 | Brumley ................. G06F 21/51 |
| 9,223,967 | B2* | 12/2015 | Ghose ..................... G06F 21/79 |
| 9,436,603 | B1 | 9/2016 | Pohlack |
| 10,061,582 | B2* | 8/2018 | Johnson ................ G06F 8/4441 |
| 11,755,731 | B2* | 9/2023 | Favor ................. G06F 9/30189 |
| | | | 726/22 |
| 2004/0123081 | A1* | 6/2004 | Knies ..................... G06F 9/3842 |
| | | | 712/225 |
| 2004/0225870 | A1* | 11/2004 | Srinivasan ............. G06F 9/3851 |
| | | | 712/E9.05 |
| 2005/0066311 | A1* | 3/2005 | Hagmeier ........... G06F 11/3636 |
| | | | 717/128 |
| 2005/0091516 | A1* | 4/2005 | Mcdermott ............. G06F 21/71 |
| | | | 713/189 |
| 2005/0204119 | A1* | 9/2005 | Saha ..................... G06F 9/3842 |
| | | | 712/235 |
| 2006/0168432 | A1* | 7/2006 | Caprioli ................ G06F 9/3842 |
| | | | 712/E9.05 |
| 2009/0038008 | A1* | 2/2009 | Pike ........................ G06F 21/52 |
| | | | 726/22 |
| 2009/0049545 | A1* | 2/2009 | Nagpal ................... G06F 9/526 |
| | | | 726/22 |
| 2009/0089564 | A1 | 4/2009 | Brickell et al. |
| 2010/0235913 | A1* | 9/2010 | Craioveanu ........... G06F 21/563 |
| | | | 726/23 |
| 2011/0093953 | A1* | 4/2011 | Kishore ................. G06F 21/629 |
| | | | 726/24 |
| 2011/0289300 | A1* | 11/2011 | Beaumont-Smith ........................ |
| | | | G06F 9/30061 |
| | | | 712/240 |
| 2012/0290820 | A1 | 11/2012 | Olson et al. |
| 2013/0132690 | A1* | 5/2013 | Epstein ................. G06F 12/145 |
| | | | 711/159 |
| 2014/0325238 | A1* | 10/2014 | Ghose ................... G06F 9/3834 |
| | | | 711/125 |
| 2015/0379268 | A1 | 12/2015 | Singh et al. |
| 2016/0117501 | A1* | 4/2016 | Ghose ................... G06F 9/3834 |
| | | | 713/190 |
| 2016/0285894 | A1* | 9/2016 | Nelms ................... H04L 63/145 |
| 2016/0350116 | A1* | 12/2016 | Reddy ................... G06F 9/3844 |
| 2017/0024304 | A1* | 1/2017 | Dirscherl ................ G06F 11/28 |

OTHER PUBLICATIONS

MK, CN102473169B, "Dynamic System Reconfiguration" (Year: 2009).*

Craig "Zilles and Gurindar Sohi, Execution-based Prediction Using Speculative Slices" IEEE (Year: 2001).*
Bernstein et al., "Sliding right into disaster: Left-to-right sliding windows leak," In International Conference on Cryptographic Hardware and Embedded Systems, 21 pages, Springer, 2017.
Brumley et al., "Remote timing attacks are practical," Computer Networks, 48(5): 13 pages, 2005.
Bulck et al., "Foreshadow: Extracting the Keys to the Intel SGX Kingdom with Transient Out-of-Order Execution," SEC '18 Proceedings of the 27th USENIX Conference on Security Symposium, pp. 991-1008, 2018.
Evtyushkin et al., "BranchScope: A New Side-Channel Attack on Directional Branch Predictor," Proceedings of 2018 Architectural Support for Programming Languages and Operating Systems, pp. 693-707, 2018.
Evtyushkin et al., "Jump over ASLR: Attacking branch predictors to bypass ASLR. In Microarchitecture (MICRO)," 2016 49th Annual IEEE/ACM International Symposium on, 13 pages, IEEE, 2016.
Gruss et al., "KASLR is Dead: Long Live KASLR," In International Symposium on Engineering Secure Software and Systems, 16 pages, Springer, 2017.
Hähnel et al., "High-Resolution Side Channels for Untrusted Operating Systems," In 2017 USENIX Annual Technical Conference (USENIX ATC 17), pp. 299-312, Santa Clara, CA, 2017.
Intel Analysis of Speculative Execution Side Channels, White Paper, Revision 4, Intel, Document No. 336983-004, Jul. 2018.
Intel, "Resources And Response To Side Channel L1 Terminal Fault," https://www.intel.com/content/www/us/en/architecture-and-technology/l1tf.html, 13 pages, 2019.
Kiriansky et al., "Speculative Buffer Overflows: Attacks and Defenses," arXiv: 1807.03757 (https://arxiv.org/abs/1807.03757), pp. 1-12, Jul. 10, 2018.
Kocher et al., "Spectre Attacks: Exploiting Speculative Execution," arxiv: 1801.01203 (https://arxiv.org/abs/1801.01203), 2018.
Koruyeh et al., "Spectre Returns! Speculation Attacks using the Return Stack Buffer" CCS '18 Proceedings of the 2018 ACM SIGSAC Conference on Computer and Communication Security, 12 pages, 2018.
Lee et al., "Inferring fine-grained control flow inside SGX enclaves with branch shadowing," In Usenix Security Symposium, pp. 557-574, 2017.
Lipp et al., "Meltdown: Reading Kernel Memory from User Space," SEC '18 Proceedings of the 27th USENIX Conference on Security Symposium, pp. 973-990, 2018.
Microsoft, "Analysis and mitigation of speculative store bypass (CVE-2018-3639)," retrieved from the Internet at https://msrc-blog.microsoft.com/2018/05/21/analysis-and-mitigation-of-speculative-store-bypass-cve-2018-3639/, May 21, 2018.
Schwartz et al., "All You Ever Wanted to Know about Dynamic Taint Analysis and Forward Symbolic Execution (but Might Have Been Afraid to Ask)," SP' 10 Proceedings of the 2010 IEEE Symposium on Security and Privacy, 15 pages, 2010.
Stecklina et al., "LazyFP: Leaking FPU Register State using Microarchitectural Side-Channels," arXiv:1806.07480 ((https://arxiv.org/abs/1806. 07480), Jun. 19, 2018.
Xu et al., "Controlled-channel attacks: Deterministic side channels for untrusted operating systems," 2015 IEEE Symposium on Security and Privacy, pp. 640-656. IEEE, 2015.
Yarom et al., "Recovering OpenSSL ECDSA Nonces Using the Flush+ Reload Cache Side-channel Attack," IACR Cryp-ology ePrint Archive, 2014:140, 2014.
PCT International Search Report and Written Opinion for International Application No. PCT/US2019/013318, entitled "Defending Against Speculative Execution Exploits," mailed on May 6, 2019.
PCT International Preliminary Report on Patentability for International Application No. PCT/US2019/013318, entitled "Defending Against Speculative Execution Exploits," mailed on Jul. 23, 2020.
Arm Limited "Cache Speculation Side-channels" whitepaper, version 1.3, dated May 2018, pp. 1-14.

* cited by examiner

DEFENDING AGAINST SPECULATIVE EXECUTION EXPLOITS

RELATED APPLICATIONS

This application is the U.S. National Stage of International Application No. PCT/US2019/013318, filed Jan. 11, 2019, which designates the U.S., published in English, which claims the benefit of U.S. Provisional Application No. 62/616,786, filed on Jan. 12, 2018 and U.S. Provisional Application No. 62/618,508, filed on Jan. 17, 2018. The entire teachings of the above applications are incorporated herein by reference.

BACKGROUND

Recent discoveries have been made that CPU data cache timing can be abused to efficiently leak information during speculative execution. These vulnerabilities may lead to short-lived but arbitrary virtual memory access across local security boundaries in various contexts that may be exploited by a malicious actor. There are numerous variants of these vulnerabilities known to affect many modern microprocessors that use speculative execution, including certain processors by Intel, AMD, and ARM. These devices have used speculative execution and branch prediction for over 20 years, to reduce delays associated with conditional execution of application code. However, these techniques have been found to take security shortcuts that subvert isolation between security domains and thus expose sensitive application data.

The first known variant is a vulnerability in such processors in the context of a bounds check bypass, the second known variant is a vulnerability of such processors in the context of a branch target injection, the third known variant exploits the vulnerability of these processors in the context of a rogue data cache load, and the fourth known variant exploits the vulnerability of these processors in the context of speculative store bypass. The first variant includes sub-variants that are vulnerabilities in the context bound check bypass on stores, read only protection bypass, and rogue system register reads. The first, second, and fourth variants together are commonly referred to as "Spectre", and the third variant is commonly referred to as "Meltdown." Spectre also includes a Return Stack Buffer (RSB) variant that exploits the vulnerability of these processors in the context of central processing unit (CPU) return stack buffers. Spectre further includes a Spectre NGS variant that exploits the vulnerabilities of these processors in the context of lazy x87 floating-point unit (FPU) state restores. Other variants are commonly referred to as "Foreshadow." The Foreshadow SGX Enclose Comprise variant is a vulnerability of these processors in the context of encrypted data in an Intel Software Guard Extensions (SGX) enclave. The Foreshadow-NG-1 and Foreshadow-NG-2 variants are vulnerabilities of these processors in the context of virtual machines (VMS) and hypervisors running on cloud services.

Spectre, Meltdown, and Foreshadow vulnerabilities—microprocessor flaws present in virtually every server or application system throughout the datacenter and cloud—have the greatest impact on enterprises systems seen in years. These flaws compromise isolation between multiple threads in a process, multiple application processes, and, multiple virtual machines while also exposing data processed by the CPU. Shared environments and cloud services are most vulnerable, as these systems are designed to operate in multi-tenant environments while maintaining isolation between users. To avoid fallouts similar to WannaCry and Equifax, patching these flaws has become a priority with IT and security leaders.

While there is industry-wide concern about the risks posed by Spectre, Meltdown, and Foreshadow enterprise IT teams are wary about deploying available patches released by manufacturers. Some patches have even caused crashes in the kernel. Some patches released by CPU and OS vendors have caused unacceptable performance degradation of as much as 30%. These patches require updating microcode as well as changes to the OS. Software patches have failed to address the issues because they require massive amounts of recoding and recompiling of the application and updates to the microcode. These patches have often caused reboots, disabled older computers, or caused unacceptable performance loss due to disabling of speculative execution or flushes of critical memory data structures. Uncommon error messages, difficulty logging on to servers and issues with admin consoles have also been reported.

Recent microcode redesigns to address these variants have introduced critical application anomalies in functions and slowed response times. Microcode updates to chips are far too prone to unintended consequences and introduce far too much instability for most environments. Patching chip-level vulnerabilities is no simple matter. It requires installing fixes at multiple levels, resulting in an overwhelming IT initiative of updating everything from microcode to the kernel, operating system, hypervisor, libraries and more, and for every system affected. Microcode updates are often risky—one mistake can render a computer unusable. That leaves the processor industry with few options, but to promise to expedite development of new CPUs without these vulnerabilities. While this may be a long-term solution, it will take years for billions of chips to be replaced, leaving malicious actors a huge window of opportunity.

SUMMARY

Unlike prior approaches, embodiments of the present invention protect applications from being exploited through variants of Spectre, Meltdown, Foreshadow, and the like immediately (in real-time), while the application code is running on central processing units (CPUs) vulnerable to these variants. The embodiments implement and execute functions that operate between the application space and processing components of the speculative execution engine, such as by using a dynamic binary analysis engine and process creation and termination notification interfaces. These functions are configured to provide deterministic, real-time detection of behavior associated with exploiting Spectre, Meltdown, Foreshadow vulnerabilities, as the application code runs on the CPUs. For example, the functions may deterministically monitor the application (as the application runs on the CPU) to detect code segments of the application vulnerable to speculative execution or signature patterns characteristic of side channels that exploits vulnerabilities of speculative execution. Based on the detection, the embodiments in real-time may preemptively respond to such vulnerabilities and attempted exploits of the application. For example, as the application executes, the embodiments may patch the application code at the binary level (directly in memory rather than on disk) in a manner that disposes of such vulnerabilities, retrain branch predicting of the speculative execution engine, or terminate processes exhibiting signatures of exploiting such vulnerabilities.

The embodiments eliminate risks associated with protecting applications from Spectre, Meltdown, Foreshadow, and other such vulnerabilities by not requiring any software, kernel or microcode patches to the application, or other disruptive changes to the kernel or microcode or event resetting the CPU. The embodiments further enable the system executing the application to maintain acceptable performance levels without compatibility or stability concerns, without requiring patching the vulnerabilities in the executing application. The embodiments also can reduce the risk of data exposure by the vulnerabilities by extending protection where vendor patches are not commonly available or have not been installed or cannot be installed in view of the mission criticalness of the operation being performed.

Embodiments are directed to computer systems, methods, and program products that protect a computer application executed by a speculative execution engine from being exploited due to vulnerabilities (e.g., Spectre, Meltdown, and the like). Prior to execution of a computer application by a speculative execution engine, the systems, methods, and program products locate a sequence of instructions of the computer application in which the speculative execution engine executes the instructions out of sequence or abuse privilege escalation. In one example embodiment, the sequence of instructions that handle user controlled input comprising of an array. In example embodiments, the said array operation include one of assembly code repeat instructions: REP, REPNZ, and REPZ. In example embodiments, the repeat string operation comprises an if-then-else code block. The systems, methods, and program products determine a disposition to the sequence of instructions that forces the speculative execution engine to not execute the instructions out of sequence. In an example embodiment, the disposition includes adding to the located sequence of instructions a memory barrier instruction that causes the speculative execution engine to enforce an ordering constraint on memory operations issued before and after the memory barrier instruction. In example embodiments, the memory barrier instruction is one of assembly code instructions: LFENCE, MFENCE, SSBB, or CSDB.

During execution of the computer application by the speculative execution engine, the systems, methods, and program products change the sequence of instructions based on the disposition. The systems, methods, and program products execute the changed sequence of instructions in place of the located sequence of instructions to prevent an attack on the computer application. In some embodiments, the systems, methods, and program products report a jump to an added memory barrier instruction to the user as a potential attack.

In some embodiments, the systems, methods, and program products, prior to execution of a computer application by a speculative execution engine, detect a set of instructions vulnerable to mis-training of the indirect branch predictor of the speculative execution engine. The mis-trained branch predictor computes incorrect branch prediction targets that enables exploiting indirect branch instructions. Based on the detection of the mis-trained branch predictor, the systems, methods, and program products locate indirect branch instructions of the computer application. During execution of the computer application by the speculative execution engine, the systems, methods, and program products change the located indirect branch instructions to direct branch instructions. The systems, methods, and program products execute the direct branch instructions in place of the located indirect branch instructions to prevent an attack on the computer application.

In some embodiments, the systems, methods, and program products further calculate correct branch predictions in parallel to the mis-trained branch predictor, and use the calculated correct branch predictions to retrain the mis-trained branch predictor.

Embodiments are directed to computer systems, methods, and program products that detect an attempt of a process to exploit a vulnerability (e.g., Spectre, Meltdown, and the like) of a speculative execution environment. Upon a process being started for execution, the systems, methods, and program products suspend the execution of the process. The systems, methods, and program products determine whether the suspended process includes a signature of flushing cache memory. In an example embodiment, the signature of flushing cache memory includes a pattern of CLFLUSH, MCR, and RDTSC assembly instructions. For example, the systems, methods, and program products determine whether the suspended process includes a signature of regions of code bookended by instructions used to synchronize transactions such as hardware lock elision (HLE) and Restricted Transactional Memory (RTM) which are part of the TSX extension.

The systems, methods, and program products continue the execution of the suspended process. During the execution, if the process includes the signature of flushing memory, the systems, methods, and program products dynamically check whether the process executes the signature of flushing memory in accordance with a defined pattern. In example embodiments, the defined pattern includes a measure of frequency and speed in the flushing of the memory or threshold of times the process executes the CLFLUSH or MCR instruction. In example embodiments, the defined pattern includes a measure of frequency and speed of how many times a region of code bookended by TSX extension was flushed and how many times transient code after the TSX bookend was executed. The systems, methods, and program products take a protective action on the process if the execution meets the defined pattern. The protective action may include any of terminate the thread, terminate the process, move the process to a quarantine area, load one or more patches to remedy the process file, and report the process as malicious to the user.

In some embodiments, the systems, methods, and program products takes a protective action on the process if a cache line for a given variable in a cache of the speculative execution engine is repeatedly read by the process with increased speed over other cache lines. In some embodiments, the systems, methods, and program products take a protective action on the process if the process attempts to run a privilege level instruction in a system register.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

Figure 1A:
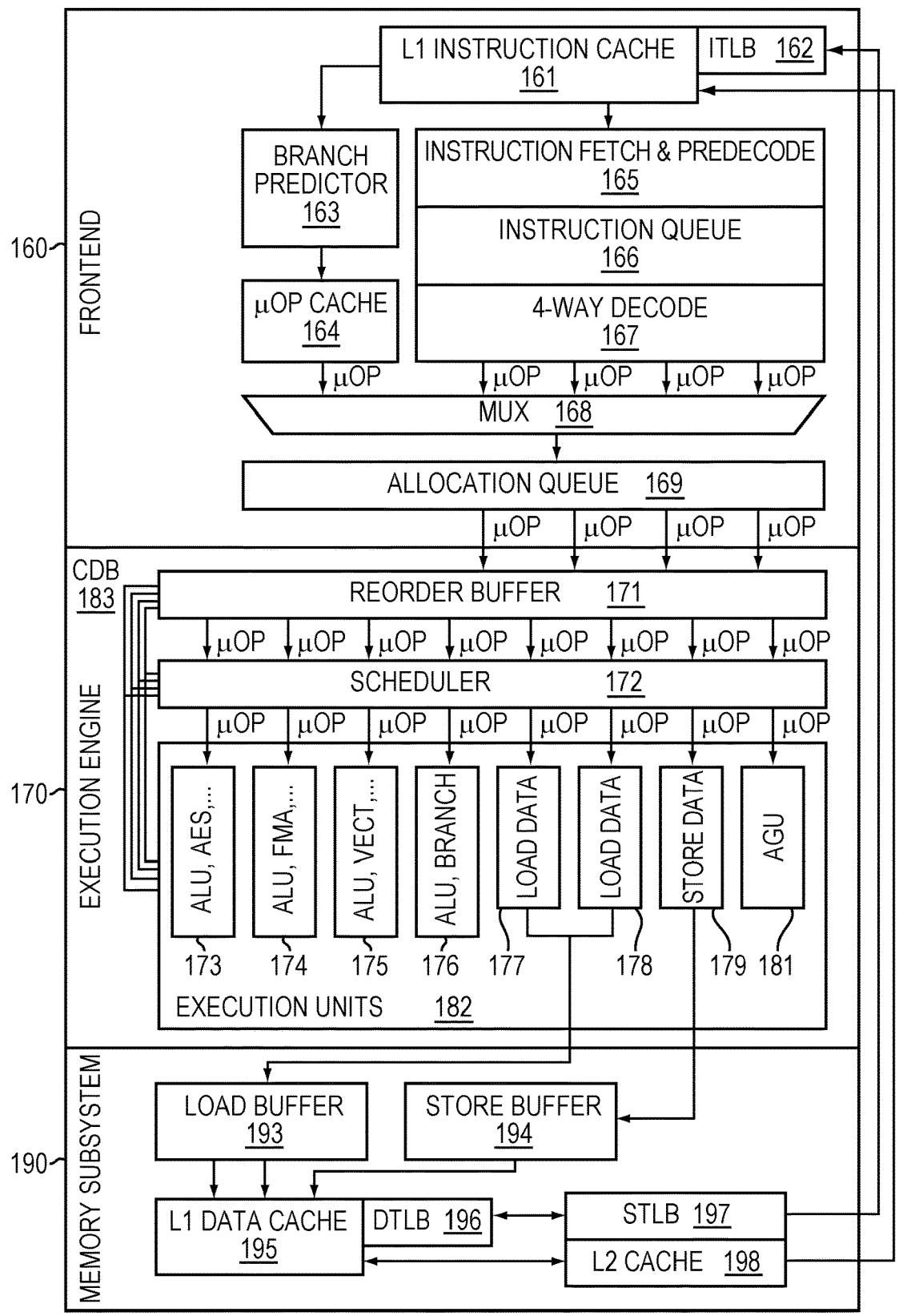
FIG. 1A illustrates an example speculative execution engine in some embodiments of the present disclosure.

A description of example embodiments follows.

The teachings of all patents, published applications and references cited herein are incorporated by reference in their entirety.

Embodiments of the present invention implement a framework that dynamically patches Spectre, Meltdown, Foreshadow vulnerabilities, and the like, as a speculative execution engine executes an application, rather than relying on the installation of OS or microcode patches. The embodiments may dynamically apply code updates similar to those in vendor patches and also code updates not available in any vendor patch. As the application executes, the framework monitors the execution of the application and identifies constructs (code segments or routines) that are not safe (vulnerable) during out-of-order execution by the speculative execution engine. As binary code of an identified construct is fetched from the main processor memory toward the CPU cache of the speculative execution engine for execution, the framework instruments instructions into the binary code to patch the vulnerability. The framework instruments the particular instructions based on the specified type of construct identified by the framework (e.g., an if-then statement or an indirect branch instruction). The framework may apply rule-based policies based on security technical implementation guides (STIGS) or user configuration to monitor the application and patch the vulnerability with particular instructions.

The framework further protects against mis-training of branch predictors of the speculative execution engine, where the mis-training enable an attacker to choose a specific destination of an indirect jump call instruction during a speculative execution cycle. To do so, the framework executes a thread that calculates the correct branch predictions in parallel to the branch predictors, which the framework uses to retrain the branch predictor against attacker influences. In these ways, the embodiments protect applications from the known risks posed by Spectre, Meltdown, Foreshadow and the like, without changing existing code or causing a significant impact on system performance. These embodiments protect vulnerable application in real-time, effectively virtually patching vulnerabilities well before software vendors can design patches for the vulnerabilities.

In some embodiments, the unrecognized files on disk that are not part of an OS or any known software package actively install by the user are not started. To make such a determination of unrecognized files, prior to starting processes for execution, the framework computes checksum for the respective executables and libraries and compares the checksums against a signature database containing valid checksums for the said files. If the checksums do not match, the framework may not start the process, move the process to a quarantine area, restore a valid copy of the process file, load one or more patches to remedy the executable or library, and report the process as malicious to the user.

Otherwise, the framework continues to scan the executables and libraries, as the respective processes are started for execution, and identifies whether the process includes a signature of flushing memory that could be used to exploit Spectre and Meltdown vulnerabilities. If the process is identified to include such a signature, as the process executes, the framework monitors the process in real-time (e.g., using mechanisms such as dynamic binary instrumentation or function hooking technology) to detect if the process executes the signature in accordance with a defined pattern (e.g., flushing at a certain frequency or speed, or reading a cache line for a particular variable faster than other cache lines or flushing instruction within a TSX bookend) characteristic of exploiting such vulnerabilities. As the process executes, the framework also monitors the process in real-time to determine if the process uses system/kernel registers (e.g., in Ring 0, such as CR0, CR1, CR2, CR3, etc.) with a privilege level instruction. If the process meets a defined pattern threshold or uses system/kernel register with a privileged level instruction, the framework may terminate the process, move the process to a quarantine area, restore a valid copy of the executable or library file, load one or more patches to remedy the process file, and report the process as malicious to the user. By leveraging this framework, the embodiments execute techniques to thwart exploits that take advantage of Spectre, Meltdown, and other vulnerabilities caused by speculative execution.

Embodiments reliably identify instructions that perform user-controlled memory reads and prevents instructions from accessing out-of-bounds memory during speculative execution—as seen in Spectre variant 1 attacks. Embodiments also prevent mis-training of branch predictors—as seen in Spectre Variant 2 attacks. Embodiments also disables side-channel attack code and terminates attacker launched processes to block exploitation using Meltdown. The example embodiments provide the detection and prevention of current Spectre, Meltdown, Foreshadow exploits, as well as future attack variants that will inevitably appear.

At the highest level, embodiments incorporate the following mitigation mechanisms for detecting and protecting a victim process executing in the speculative execution environment:

| Variant | Description |
| --- | --- |
| Spectre 1 | Find code that has out of bounds bypass vulnerability - then rewrite the binaries so that FENCE instructions are inserted between vulnerable instruction sequences |
| Spectre 2 | Find indirect branches and turn these into direct CALL instructions using a DBI technology in real time. |
| Spectre 2/Meltdown | Detect if the victim's code is being redirected to execute ROP Gadgets |
| Spectre 2 | Use threads that "re-train" that executes the "actually" executed branch to undo any learning done by the Branch Target Buffer. |
| Meltdown | Identify instructions that are transient in nature - right after a TSX bookend. If these instructions are executed on the same thread on which an exception occurred |
| Spectre NG3 | Flushing FPU state when a new thread starts executing for the first time. |
| Meltdown | Count number of times an instruction is taking exceptions and when it exceeds a threshold |
| Meltdown | Count number of times a parent process spawned a short-lived child process and when it exceeds a threshold |
| Spectre 1 | Detecting if an application is jumping over a FENCE Instruction |
| Spectre RSB | Detecting when a source address not part of a trusted function attempts to jump to an SGX enclave |
| Spectre RSB | Every time there is a switch into the kernel, the RSB is intentionally filled with the address of a benign delay gadget (similar to Retpoline) to avoid the possibility of mis-speculation |
| Foreshadow | Exceptions occurring in trusted enclave code |
| Foreshadow SGX Enclave | SGX Launch Key ID tracking by various processes and detecting unauthorized access via Launch Key being used without initializing |
| Spectre NG3 | Actively change the bios setting (eagerfpu = on) for Lazy FPU Context Switching mode |

The embodiments detect and prevent Side Channel attacks using:
Process Initialization checks against whitelist
Detect processes exhibiting excessive FLUSH+RELOAD tendency
Detect processes exhibiting excessive PRIME+RELOAD tendency
Detect user code trying to access system registers
Detect user code trying to run privileged instructions
Detect processes executing TSX Transient instructions
Detect instructions that attempt to flush RSB Stack—see section 1.8
Detect processes that perform excessive OS Context Switches beyond a threshold
Detect processes that perform longjmps( ) beyond a threshold
Detect processes that trigger C6 Sleep State Speculative Execution Engine FIG. 1A illustrates an example speculative execution engine 100 in some embodiments of the present disclosure. Speculative execution introduces concepts, like out-of-order execution and branch prediction, which are not normal paradigms in software design. Such speculative execution causes vulnerabilities (e.g., Spectre, Meltdown, Foreshadow, etc.) while executing an application. These vulnerabilities may be exploited by malicious actors to gain unauthorized access to data of the executed application.

The speculative execution engine 100 includes a Frontend 160, Execution Engine 170, and Memory Subsystem 190. The Frontend 160 moves instructions of an application from the application space into the L1 Instruction Cache 161 coupled to an Instruction Translation Lookaside Buffer (ITLB) 162. The Frontend 160 fetches the instructions from the L1 Instruction Cache 161 and decodes the instructions into micro-operations (μOps). The Frontend 160 performs the decoding by use of Instruction Fetch & PreDecode 165, Instruction Queue 166, and 4-Way Decode 167. The Branch Predictor 163 of Frontend 160 predicts (guesses) the order in which the decoded instructions (μOps) will be executed is based on training that occurred through past instruction processing. The predicted order of executing the μOps is provided by the Branch Predictor 163 (via μOps Cache 264) to the MUX 168 and the Frontend 160 also provides the μOps to the MUX 168, which places the μOps into the Allocation Queue 169 in the predicted order.

The Execution Engine 170 includes a Reorder Buffer 171, which allocations registers to the ordered and pending μOps in the Allocation Queue 169, and also renames and retires the μOps. According to the register allocation, the Scheduler 172 of the Execution Engine 170 executes the pending μOps that are ready for execution at the Execution Units 182, including 173, 174, 175, 176, 177, 178, 179, and 181. The Scheduler 172 decides that a pending μOps is ready for execution when the Common Data Bus (CDB) 183 indicates that the data required by pended μOps is available. If predicted order by the Branch Predictor 163 is determined to be incorrect by the Execution Engine 170, the Reorder Buffer 171 rolls back and clears those the μOps from the Scheduler 172.

The Memory Subsystem 190 includes a L1 Data Cache 195. The data required in executing the μOp is transmitted from main processor memory (via the load data 177, 178 and store data 179 Execution Units 182) into the load buffer 193 and store buffer 194, which in turn transmits the required data to the Data Cache 195 coupled to the Dual Translation Lookaside Buffer (DTLB) 195. For processing the required data, the Data Cache 195 is in communication with another L2 Cache 198 coupled to a Second-Level Translation Lookaside Buffer (STLB) 197.

An attacker may take advantage of the vulnerabilities of speculative execution (Spectre, Meltdown, Foreshadow, etc.) by continuingly clearing the Data Cache 195 (e.g., using an unprivileged instruction like CLFLUSH). The attacker allows the Execution Engine 170 sufficient time to access the flushed cache line. The attacker then accesses the flushed cache line again. If the Execution Engine 170 has used the cached line (e.g., to process other μOp), the load will be quicker (since it is available in the L2 Cache 198) than if the Execution Engine 170 has used the cached line and the cache must be loaded from main process memory. The clearing of the L2 Data Cache 195 causes data required for executing μOps of a particular instruction in a code block to be unavailable. If μOps comprising other later instructions in the same code block are not waiting for required data, the Scheduler 172 executes those μOps (ahead of the μOps for the earlier instructions of the code block waiting for required data). In parallel, the attacker can control (set, clear, and the like) values of variables used in executing the μOps and determine if certain critical instructions in the application are triggered. The attacker may then manipulate those critical instructions to steal data processed by those instructions.

Figure 1B:
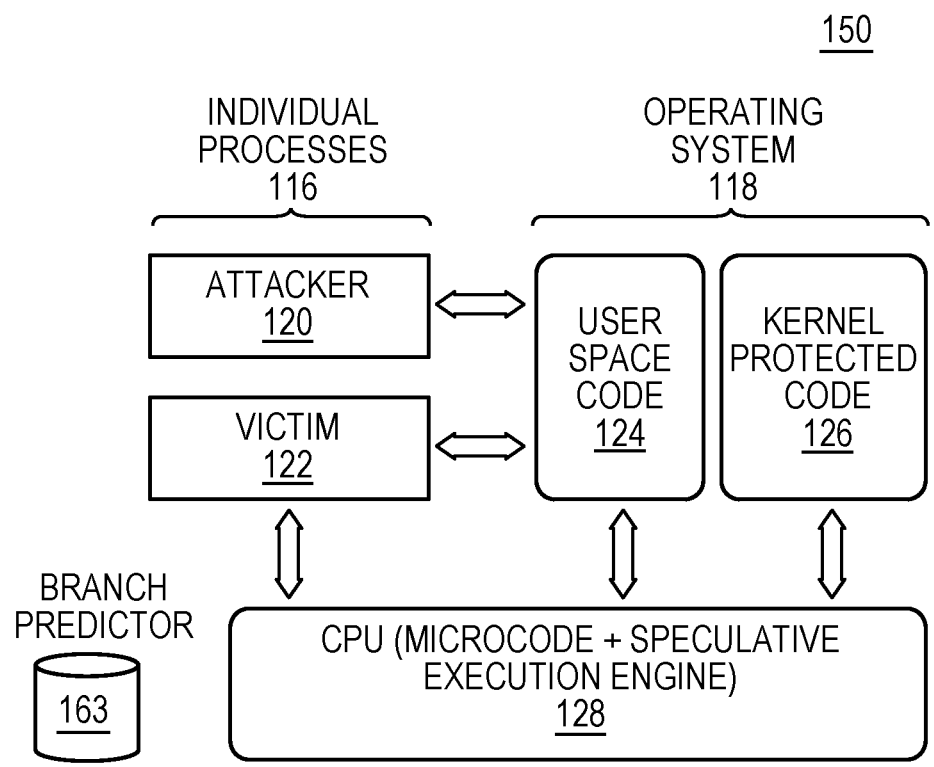
FIG. 1B illustrates example infrastructure used to exploit vulnerabilities in some embodiments of the present disclosure.

FIG. 1B illustrates an example infrastructure 150 used to exploit Spectre/Meltdown/Foreshadow vulnerabilities in some embodiments of the present invention. The exploiting of the Spectre, Meltdown, and Foreshadow vulnerabilities was designed using carefully crafted malicious processes that have the ability to violate the isolation between security domains. Hardware vulnerabilities in the speculative execution engine enable attackers to break down isolation between sets of individual processes 116 (via a cache side channel attack). These vulnerabilities allow one process (an attacker process 120) executed by a CPU 128 (microcode+speculative execution engine 100) to manipulate data from another process (a victim process 122) processed by the CPU 128 or a branch predictor 163. The victim process 122 comprises part of the functions of an application being executed by the speculative execution engine 100. These vulnerabilities enable the attacker process 120 to manipulate the Operating System 118 executed by the CPU 128 in both the user space code 124 and kernel protected code 126. Even error-free applications (e.g., including victim process 122) can become victim based on these vulnerabilities. The very low-level nature of exploitation means there is no trace in any log file left behind.

Some speculative execution vulnerabilities (e.g., Meltdown) that allow cache side channel attacks are contingent on page file access. Containers share a kernel (kernel protected code 226), and therefore, applications running in containers are affected more than those in virtual machines (VMs) since the latter does not share a kernel. Hypervisors, like VMWare, typically discourage allowing extended page table access or page sharing access across VMs, but may still be used in private cloud environments. The most practical way to stop these attacks is in the application process memory—before the underlying weaknesses can be exploited by an attacker. For example, Google has used a "Retpoline" approach which closes the window of opportunity on cache side channel attacks that target indirect branches during speculative execution.

One type of cache side channel attack is flush and reload, which is a multicore side channel attack with the last level cache. This attacker process 120 takes advantage of the same physical memory, such as libc, being mapped into multiple processes. This attack consists of the attacker process 120 first evicting the L1 Data Cache 195 using an unprivileged instruction, like CLFLUSH. The attacker process 120 then allows the victim process 122 sufficient time to access the flushed cache line. Next, the attacker process 120 accesses the flushed cache line again. If the victim process 122 has used the cache line, the load will be quicker (since it is available in L2 cache 198) than if the victim process 122 has not and the cache must be loaded from main memory. The attacker process 220 uses the RDTSC instruction to get accurate timing for the flush. In parallel, the attacker process 220 detects if certain critical instructions in the victim process 222 have been triggered, which makes it easy for the attacker process 220 to steal data processed by those instructions.

Another type of cache side channel attack is prime and probe, which may be used when VMWare does not allow page table access. This attack only requires the attacker process 120 have access to L1 Data Cache 195 and the ability to map large chunks of memory into VM. This attack consists of the attacker process 120 "priming" one or more cache sets with chosen data or instructions. The attacker process 120 then waits for the victim process 122 to execute the L1 Data Cache 195. If the victim process 122 has utilized the cache, the victim process 122 will have removed some of the attacker's code or data. After a predetermined time, the attacker process 120 probes the L1 Data Cache 195 that it previously primed to check if the victim process 122 has used the cache line or not. To do so, the attacker process 120 determine if the data in the primed location came from a next level cache or from main memory. The attacker process 120 uses the RDTSC instruction to get accurate timing for probing the cache.

Kernel Page-Table Isolation (KPTI) introduced a protection technique called KAISER to protect against side channel attacks bypassing kernel level address space randomization (KASLR). The protection is based on un-mapping kernel pages while in user mode and remapping them on a mode switch to the kernel. As a result, mis-speculation from user code is not able to access kernel memory, thereby preventing Meltdown. Embodiments of the present invention may dynamically detect contextually inappropriate diversion of application's user space code into kernel code, as the victim process 120 is executed by the CPU. Note, it has been reported that KPTI can introduce substantial performance overhead. KPTI cannot prevent attacks within the same privilege mode (e.g., to access memory outside a sandbox).

Another Side Channel Attack is on an empty return stack buffer (RSB). RSB Stack becoming empty is the root cause of the problem. Any one or more of the following can cause the RSB stack to empty out: Excessive TSX aborts, Write WRMSR to 0x79 (microcode update), 0x7A (SGX activation)., WRMSR/RDMSR to/from 0x8C-0x8F (SGX Launch Enclave Public Key Hash), SGX instructions (ENCLS, ENCLU) and SGX CPUID leaf., Excessive number of OS Context Switches, Excessive number of user space exceptions, Excessive calls to longjmp( ) and Excessive invocation of sleep state of C6 or deeper.

When the RSB "stack" is empty on these speculative execution processors, a RET instruction may speculate based on the contents of the indirect branch predictor, the structure that retpoline is designed to avoid. This means that defenses around "retpoline" become useless. The RSB may become empty under the following conditions. One condition is Call stacks deeper than the minimum RSB depth (16) may empty the RSB when executing RET instructions. This includes CALL instructions and RET instructions within aborting TSX transactions. Intel Transactional Synchronization eXtensions (TSX) is the product name for two x86 instruction set extensions, called Hardware Lock Elision (HLE) and Restricted Transactional Memory (RTM). RTM is an extension adding several instructions to the instruction set that are used to declare regions of code that should execute as part of a hardware transactions. Another condition is Indirect Branch Predictor Barrier (IBPB) command may empty the RSB. Note, HLE is a set of prefixes that can be added to specific instructions. These prefixes are backward-compatible so that code that uses them also works on older hardware. A further condition is SGX instructions (ENCLS, ENCLU) and SGX CPUID leaf. Another condition is Imbalance between CALL instructions and RET instructions that leads to more RET instructions than CALL instructions, such as OS context switch, C++ exception, and longjmp. A further condition is Entering sleep state of C6 or deeper (for example, MWAIT) may empty the RSB.

The depth of the call stack may depend on many factors that are not known until runtime which makes the call stack difficult to mitigate in software. However, exploiting a deep call stack is expected to require much more comprehensive control and prediction of the behavior of the CPU and program state than a traditional branch target injection (Spectre variant 2) attack. The attacker process aims to cause the RSB stack to become empty at which point further attempts to speculation will be based on the indirect branch predictor. Once the speculation execution engine uses the indirect branch predictor, Spectre 2 attacks become possible.
Prevention of Spectre/Meltdown/Foreshadow Exploitation The following describes the different variants of Spectre/Meltdown, and how exploitation of these variants is prevented by embodiments of the present disclosure.

Spectre Variant 1 (CVE-2017-5753)

Spectre Variant 1 (Spectre 1) is a microprocessor vulnerability that allows an attacker process to cause an otherwise correctly executing code to expose information to an attacker that would not normally be exposed. See Paul Kocher et al., "Spectre Attacks: Exploiting Speculative Execution," arxiv:1801.01203 (https://arxiv.org/abs/1801.01203), 2018 for further details on this variant.

Spectre Variant 1 is due to bounds checks being temporarily bypassed on loads and changing the cache states of the microarchitecture, thereby leaking information through side-channel timing analysis. Spectre Variant 1 exploits design flaws in Intel architecture that permit out-of-bounds memory access within the speculative execution window. During this time, conditional branch predictions of branch predictors 163 temporarily bypass bounds checks and can access arbitrary addresses in memory. Contents from this address are saved in the L1 Data Cache 195 until the processor catches up with the mis-prediction and flushes its state from the cache. During this window, a side channel attack can steal this information from the cache 195. By looping this cycle of out-of-bounds access to arbitrary memory and stealing the contents from the cache 195, sensitive data such as social security numbers, credit card numbers or other privileged information.

In attacks using bounds check bypass, the attacker process (e.g., attacker process 120 of FIG. 1B) leverages the speculative execution behavior of the microprocessor in order to cause some code to expose more information than intended. This attack requires an attacker process to identify a possible confused deputy segment of code that is used to check whether an input is in bounds. For example:

If (input<array_size)//Line 1//
val=data[array[input]]; //Line 2//

In the code above, there is an input validation check (line 1) that ensures that input does go out of bounds. Once such code segment is identified, the attacker process can then train the processor's branch predictor 163 that the bounds check will likely be true. This is done by repeatedly invoking the code with valid values for the "input" parameter. Once the branch predictor 163 is trained, the attacker process can then invoke the same code with a malicious value for the "input" parameter that is outside of bounds and with the value of array_size uncached. When invoked, the branch predictor 163 predicts that (just like before) the "if" statement will be true, speculatively executing "val=data[array[input]];" using the malicious value for the "input parameter." In other words, the processor is being tricked into executing the wrong code path using the invalid values for the "input" parameter. The processor then loads the value for the "input" parameter from data into the cache at the address given by array[input] which is controlled the attacker.

Since the value of array_size was not cached, there is a delay from the time the processor starts "val=data[array[input]];" until the value of array_size comes back to indicate that the processor speculated incorrectly. When this happens, the processor throws away the wrongly speculated instructions from the cache 195 (the vulnerability calls transient instructions), but the change in cache state is not reverted. Detecting the un-reverted cache state, the attacker process can it to find a byte of the victim's memory. The attacker process can repeatedly use this procedure to read a larger part of memory used by another process on the same or different virtual machine.

Embodiments of the present invention invoke two distinct and independent mitigations for this variant. The mitigation approaches do not require modification to the application or disruptive changes to kernel or microcode used by the victim process 122. The mitigation approaches protect the victim process (e.g., victim process 122 of FIG. 1B) by placing a FENCE (x86) instruction or CSDB (ARM) instruction between basic blocks generated by Line 1 and Line 2 of the code shown above. As a result, the two lines are considered as a single block and thus cannot be executed independently. Embodiments dynamically apply FENCE or CSDB instructions so that the burden is not placed on the developer. In addition, the mitigation approaches help mitigate issues in third party code that is available only in object form.

Figure 1C:
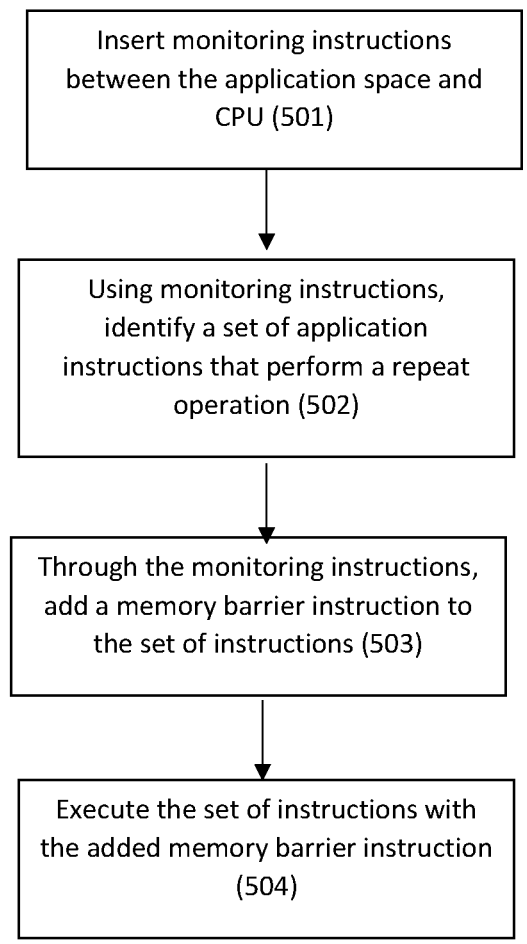
FIGS. 1C-1G illustrate example methods for mitigating vulnerabilities of speculative execution in some embodiments of the present disclosure.

This first mitigation approach of the present invention (to protect the victim process) for this variant is shown in the method of FIG. 1C. The method 191 of FIG. 1C inserts 501 monitoring instructions between the application space and CPU of the speculative execution engine. Using the monitoring instructions, as an application executes, the method 191 analyzes and identifies 502 a set of application instructions that perform a repeat operation, such as an if-then code block. The specific set of instructions can be defined by applying rule-based policies based on security technical implementation guides (STIGS) or user configuration. Embodiments identified locations in code using either a compiler-based approach or a dynamic taint analysis-based approach. See, e.g., Schwartz et al., "All You Ever Wanted to Know about Dynamic Taint Analysis and Forward Symbolic Execution (but Might Have Been Afraid to Ask)," SP '10 Proceedings of the 2010 IEEE Symposium on Security and Privacy, pages 317-331, 2010. Through the monitoring instructions, the method 191 adds 503 a memory barrier instruction that causes the speculative execution engine to enforce an ordering constraint on memory operations issued before and after the memory barrier instruction, such as a FENCE (x86) instruction or CSDB (ARM) instruction, to the set of instructions. Such a barrier instruction prevents an attacker from using the instructions to access out-of-bounds memory during speculative execution. The method 191 executes 504 (by the speculative execution engine) the set of instructions with the added memory barrier instruction.

In the second mitigation approach of the present invention for this variant, embodiments take steps to reliably detect and disable attacker processes (side-channel attack processes). This second mitigation approach of the present invention for this variant (to protect the victim process) is shown in the method 192 of FIG. 1D. The method 192 intercepts 506 spawned process, such as when the spawned process starts to execute. The method statically or dynamically checks 507 the code (executables and libraries) of the intercepted process for code that performs actions associated with (signatures of) exploiting vulnerabilities causes by speculative execution. Such actions (e.g., known covert side channels) may be identified by applying rule-based policies that are defined based on security technical implementation guides (STIGS) or user configuration. In other words, all executables or libraries or combinations not part of the OS or other known packages deliberately installed by the user will be terminated. For example, side channel attacks may repeatedly run CLFLUSH, MCR, and RDTSC code instructions, and a policy may be defined and applied to check for such action. The method 191 identifies 508 a process that includes such code instructions to be a potential attacker process.

The method 192 inserts 509 instructions to monitor the data cache of the speculative execution engine. Using the monitoring instructions, the method 192 applies a read time stamp technique to check the actions of the potential attacker process. In this technique, using the monitoring instructions, the method 192 finds 510 a cache line for a variable of the executed code that is read faster than other cache lines by the identified process based on analyzing the time stamp associated with the cache line. Such faster read of the cache line is indicative of the data in that cache line being currently present in the data cache. The method 192 maintains 511 a count of such reads of a cache line by the identified process. If the count exceeds a threshold, the method 192 takes 512 a protective action, such as terminates the attacker process, moves the attacker process to a quarantine area, restores a valid copy of the process file, load one or more patches to remedy the process file, and report the process as malicious to the user.

Figure 1D:
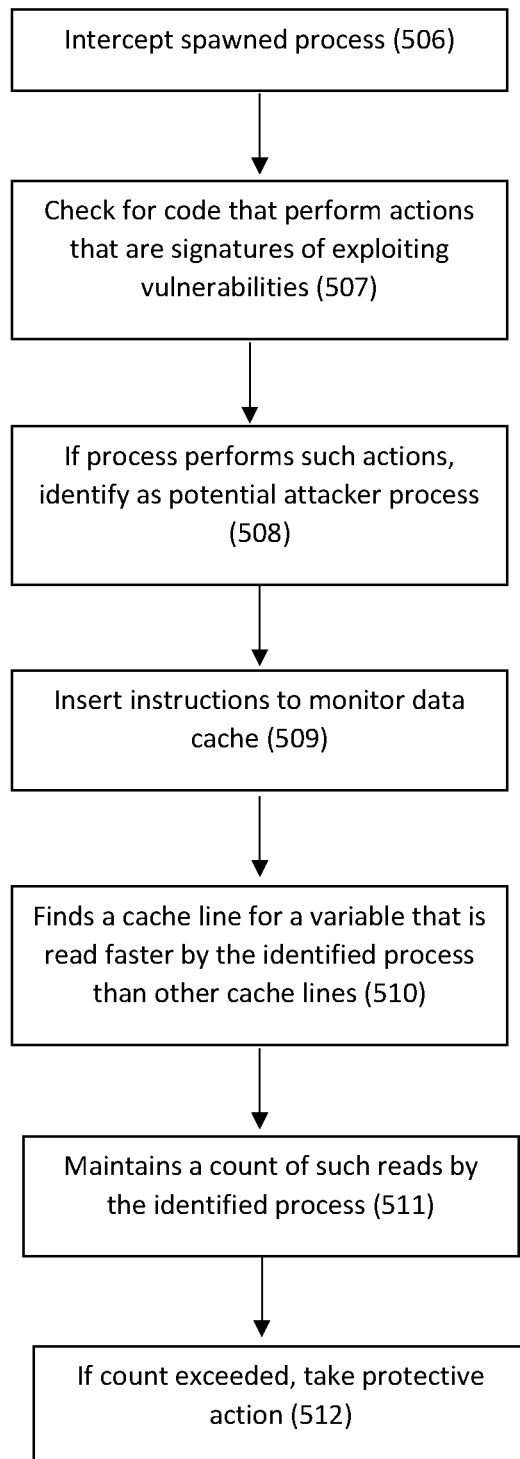
Figure 1E:
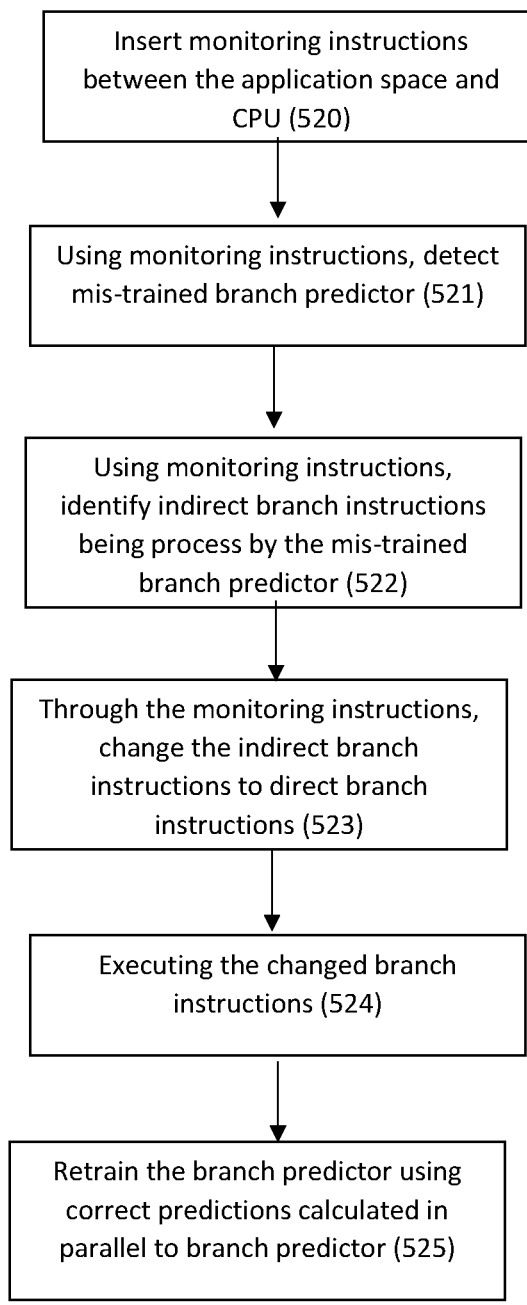
Figure 1F:
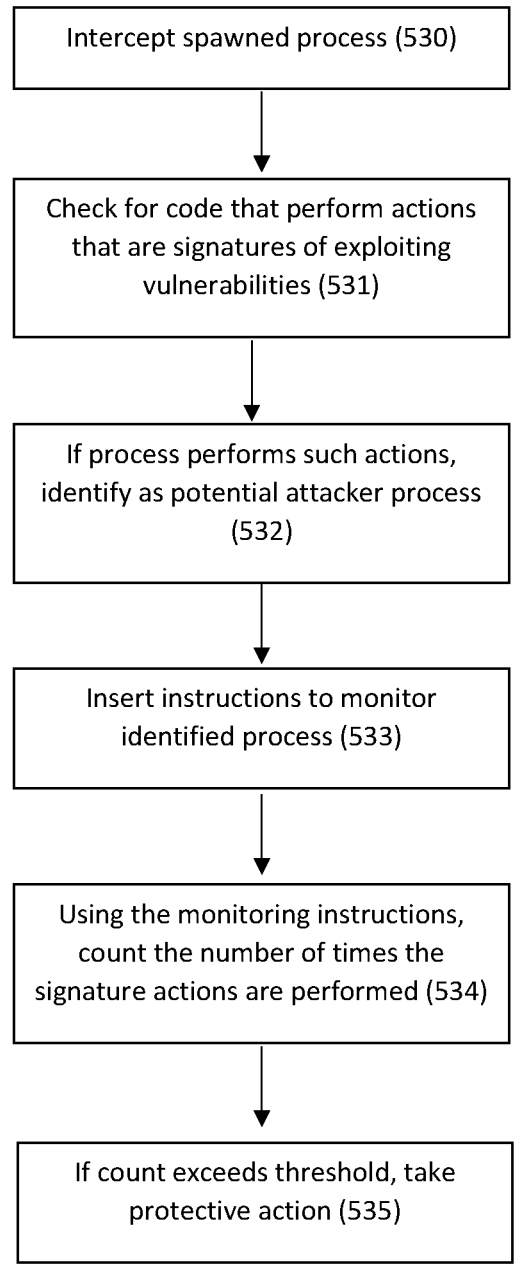

The second mitigation approach of the present invention for this variant (to protect the victim process) further includes the method 194 of FIG. 1F. The method 194 intercepts 530 spawned process, such as when the spawned process starts to execute. The method statically or dynamically checks 531 the process file of the intercepted process for code that performs actions associated with (signatures of) exploiting vulnerabilities causes by speculative execution. Such actions (e.g., known covert side channels) may be identified by applying rule-based policies that are defined based on security technical implementation guides (STIGS) or user configuration. For example, side channel attacks may repeatedly run CLFLUSH, MCR, and RDTSC code instructions, and a policy may be defined and applied to check for such action. The method 194 identifies 532 a process that includes such code instructions to be a potential attacker process.

The method 194 inserts 533 instructions to monitor the operations of the identified process. Using the monitoring instructions, the method 194 detects and counts 534 the number of time the signature actions are performed. The method 194 may also consider the frequency, order, or such in which the signature actions are performed in determining the count. If the count exceeds a threshold, the method 194 takes 535 a protective action, such as terminates the attacker process, moves the attacker process to a quarantine area, restores a valid copy of the process file, load one or more patches to remedy the process file, and report the process as malicious to the user.

The method 194 of FIG. 1F also monitors any attempt by the identified process to run privilege level instructions using registers that are used by the system/kernel (e.g., Ring 0). These registers include the following system registers (Ring 0): he eight 32-bit processor control registers: CR0, CR1, CR2, CR3, CR4, CR5, CR6, CR7; the lower 16 bits of CR0 is called the Machine Status Word (MSW); the four 16-bit table registers: GDTR, IDTR, LDTR and TR; the eight 32-bit debug registers: DR0, DR1, DR2, DR3, DR4, DR5, DR6 and DR7; the five test registers: TR3, TR4, TR5, TR6 and TR7; the memory type range registers; the machine specific registers; and the machine check registers. These privileged level instructions include: LGDT Loads an address of a GDT into GDTR; LLDT Loads an address of a LDT into LDTR; LTR Loads a Task Register into TR; MOV Control Register Copy data and store in Control Registers; LMSW Load a new Machine Status WORD; CLTS Clear Task Switch Flag in Control Register CR0; MOV Debug Register Copy data and store in debug registers; INVD Invalidate Cache without writeback; INVLPG Invalidate TLB Entry; WBINVD Invalidate Cache with writeback; HLT Halt Processor; RDMSR Read Model Specific Registers (MSR); WRMSR Write Model Specific Registers (MSR); RDPMC Read Performance Monitoring Counter; and RDTSC Read time Stamp Counter. If the identified process is detected as running one of the above privilege level instructions using one of the above registers, the method 194 takes a protective action, such as terminating the attacker process, moving the attacker process to a quarantine area, restoring a valid copy of the process file, loading one or more patches to remedy the process file, and reporting the process as malicious to the user.

Spectre Variant 2 (CVE-2017-5715)

Spectre Variant 2 (Spectre 2) is a microprocessor vulnerability that enables an attacker to cause otherwise correctly executing code to expose information to the attacker that would not normally be exposed. See Paul Kocher et al., "Spectre Attacks: Exploiting Speculative Execution," arxiv: 1801.01203 (https://arxiv.org/abs/1801.01203), 2018 for further details on this variant. for further information on this variant. Spectre 2 is due to a wrong branch target being temporarily chosen, thus changing the cache states of the microarchitecture, and thereby leaking information through side-channel timing analysis. For this attack to be implemented, only speculative execution is needed—the processor can still be executing instructions in-order.

This second variant may use a technique known as indirect branch poisoning, because the speculative execution engine does not adequately isolate code or data between processes. That is, the branch prediction algorithm for a victim process can be mis-trained by an attacker process because the branch predictor 163 does not isolate its learnings between security domains. If the destination address of an indirect branch instruction is delay-read in memory (due to a cache miss), and the branch predictor 163 has already been mis-trained, the attacker process can choose a specific destination in the victim process during the speculative execution cycle. The exploit can then use run-oriented programming (ROP) gadgets in the victim process memory to leak secret information. In attacks of this variant, a branch target injection by an attacker process leverages the speculative execution behavior of the microprocessor in order to cause some code to expose more information than intended. The attacker process influences the indirect branch in the microprocessor to speculatively execute malicious code, which leaves behind a microarchitectural state that the attacker process can then use to infer data values.

A conditional direct branch only has two possible paths that can be speculatively executed. A target branch may be taken or alternatively the execution may "fall-through" to subsequent instructions to be executed. Unlike direct branches, an indirect branch can cause the microprocessor to speculatively execute a very wide range of possible targets. This attack is done by causing a direct branch to speculatively execute a segment of code. If the attacker carefully chooses code that effectively result in Spectre Variant 1, then the attacker can infer sensitive data from the victim process's memory space.

Consider simple C++ inheritance such as the example below:

```
class Shape {
    public:
    virtual void Draw( ) = 0;
};
class Circle : public Shape {
    public:
    void Draw( ) override { . . . }
};
```

Where Shape is the base class and Circle is a derived class. Now consider the following code segment.

Shape*obj=new Circle;
Obj->Draw( );

In typical polymorphic code such as the example above, the target address of virtual function Draw( ) cannot be determined at compile time, thus resulting in an indirect branch that must be resolved at run-time. During run-time, a dynamic lookup is performed to find the matching function. While this happening, the microprocessor guesses (predicts) the target address and right away starts to speculative execute that code at the guessed target address. The attacker process needs to find code like the example above that when manipulated through the indirect branch predictor, can lead the microprocessor to speculative execute code that results in in Spectre Variant 1. The attacker process can then use the Spectre Variant 1 to infer sensitive data from the victim's memory space.

This first mitigation approach of the present invention (to protect the victim process) for this variant is shown in the method 193 of FIG. 1E. The method 193 of FIG. 1E inserts 520 monitoring instructions between the application space and CPU of the speculative execution engine. Using the monitoring instructions, as an application executes, the method 193 analyzes and detects 521 a mis-trained branch predictor that compute incorrect branch predictions or exhibit a speculative mis-prediction delay that enables exploiting indirect branch instructions. The mis-trained branch predictor can be detected by applying rule-based policies based on security technical implementation guides (STIGS) or user configuration. Embodiments identified locations in code using either a compiler-based approach or a dynamic taint analysis-based approach. See, e.g., Schwartz et al., "All You Ever Wanted to Know about Dynamic Taint Analysis and Forward Symbolic Execution (but Might Have Been Afraid to Ask)," SP '10 Proceedings of the 2010 IEEE Symposium on Security and Privacy, pages 317-331, 2010. Using the monitoring instructions, the method 193 identifies 522 indirect branch instructions being processed by the mis-trained branch predictor. The method 193 may use a return trampoline ("retpoline") technique causes indirect branch instructions to bounce during the speculative execution window. The retpoline technique further exploits properties of the branch predictor so that when executing a RET instruction, the predictor will utilize the return stack buffer (RSB) instead of the branch target buffer (BTB), as the RSB cannot be polluted by attackers.

Through the monitoring instructions, the method 193 changes 523 the indirect branch instructions (JMP instructions) to direct branch instructions (CALL instructions). This may be accomplished by using a dynamic binary instrumentation technique. The method 193 executes 524 the changed branch instructions (direct branch instructions in place of indirect branch instructions). The method 193 further retrains 525 the branch predictor. To do so, the method 193 calculates correct branch predictions in parallel to the mis-trained branch predictor, and uses the correct predictions to retrain the prediction algorithm of the branch predictor.

The second mitigation approach of the present invention for this variant uses the method 192 of FIG. 1D and method 194 of FIG. 1F (as described above) to detect and prevent the attacker process from exploiting such vulnerabilities of the speculative execution engine.

Meltdown Variant 3 (CVE-2017-5754)

Meltdown (Variant 3) is a microprocessor vulnerability that allows an attacker to overcome all memory isolation mechanisms offered by the microprocessor by causing it to speculatively execute code out-of-order that loads inaccessible information which end up changing the cache state of the microarchitecture, thereby leaking information through side-channel timing analysis. See Lipp et al., "Meltdown: Reading Kernel Memory from User Space," SEC '18 Proceedings of the $27^{th}$ USENIX Conference on Security Symposium, pages 973-990, 2018, further information on this variant.

Unlike both variants of Spectre, Meltdown does not require a victim process. Meltdown involves additional design flaws that expose the page table to abuse during speculative execution. During this window, user-space code can gain full access to the kernel memory without privileged access checks. As a result, an attacker process can access and load privileged data into the cache and then steal it using a side channel mechanism. By repeating this process, an attacker can eventually map the entire kernel memory. Once the kernel memory is mapped, it is easy to find ROP gadgets which can then be used to steal sensitive or privileged data. In attacks of a rogue data cache load, attacker processes leverage the speculative execution out-of-order behavior of the microprocessor in order to cause some code to expose more information than intended. Specifically, Meltdown breaks the basic memory isolation assumptions that's used by the operating system to manage the virtual memory of each process (victim process and attacker process). Stealing privileged information from the kernel helps malicious actors map the memory layout as a precursor to launching even more insidious attacks (e.g., by abusing a page table).

Consider the following code: "char val=*(char*) 0xAAAAA;".

When executed, this line will likely cause a segmentation fault due an access restriction violation. However, the microprocessor can continue to execute subsequent transient instructions out-of-order while the memory reference is being resolved (including TLB lookup and page table walk, if necessary), i.e., the microprocessor does not wait for resolution to complete. In Meltdown-affected processors, the speculative execution happens even if data reference points to an existing, but privileged memory area, i.e., the above "val" is speculatively available to subsequent speculative instructions. Example: consider the following (simplified) code.

```
char probeTable[256] = {0}; /* op 1 */
/* ... */
char val = *(char *)0xAAAAA; /* op 2 */
char temp = probeTable[val]; /* op 3 */
```

Consider what happens when op 2 is executed. The microprocessor performs the load. If address 0xAAAAA points to OS kernel data, access will not be allowed, but 0xAAAAA pointing to OS kernel data can only be known after page tables are examined. While the examination occurs, the microprocessor will speculatively execute op 3 while memory load in op 2 did not reach the retire stage. When op 2 is retired, exception is raised and speculative execution results are dropped. However, if probeTable was uncached, the code in op 3 caused a cache miss, resulting the microprocessor going and grabbing the value from main memory. By measuring time to read each probeTable[i] element, an attacker process can determine which element is cached now. From this, the attacker process can infer the value of "val." This approach can then be applied repeatedly by the hacker to read a larger part of memory that may be associated with the kernel.

In an attack example, where the exception instruction is retired from microcode, the attacker uses a parent process to spawn child processes which execute the transient instruction set. When the exception is retired, the child process takes an unhandled exception and terminates, but not before privileged kernel data is pulled into cache. The parent process steals the exposed data through a side channel attack. This process can be repeated until the entire kernel memory is mapped. This cycle of child processes spawning and terminating is observable outside the speculative execution window. If a child process dies due to an exception because it tries to access a protected address and repeatedly, the parent process can be terminated based on policy.

The mitigation approach of the present invention for this variant uses the method 192 of FIG. 1D and method 194 of FIG. 1F (as described above) to detect and prevent the attacker process from exploiting such vulnerabilities of the speculative execution engine.

Spectre 1, Subvariant 1 (CVE-2018-3639)

This subvariant of Spectre 1 (Spectre 1.1) bypasses bounds checks on stores (BCBS). As the name suggests, in order to improve performance, the processor speculates about the future execution flow of a program (the Linux kernel can be thought of as a special kind of program for this purpose), running potential program instructions along the speculative path until it is confirmed whether the speculated path was correct or incorrect. In the case that the speculated path was correct, a performance improvement is obtained. In the case that the speculated path was incorrect, any results obtained from the speculation must carefully be unwound to return the microprocessor to the correct path in such a way as to ordinarily be undetectable. See Vladimir Kiriansky et al., "Speculative Buffer Overflows: Attacks and Defenses," arXiv:1807.03757 (https://arxiv.org/abs/1807.03757), 2018 for further information on this subvariant.

Consider the example:

| | |
|---|---|
| if(x < lenb) | // Line 1 // |
|    return a[b[x] * 512]; | // Line 2 // |
| if (y < lenc) | // Line 3 // |
|    c[y] = z; | // Line 4 // |

During speculative execution, the processor may ignore the bounds check on line 3 above. This provides an attacker with the full power of an arbitrary write. While this is only a speculative write, which leaves no architecturally-visible effects, the speculative write can still lead to information disclosure via side channels. As a simple proof-of-concept attack, suppose "c[y]" points to the return address on the stack, and "z" contains the address of line 2. During speculative execution of a function return, execution will be re-steered to the transmission gadget, as previously described. Note that even if a fence instruction (e.g., LFENCE or CSDB) is added between lines 1 and 2 to mitigate against Spectre 1, an attacker process can simply adjust "z" to "jump over the fence." Return-oriented programming (ROP) techniques can also be used to build alternative attack payloads. In a speculative data attack, an attacker process can (temporarily) overwrite data used by a subsequent Spectre 1.0 patch. Further, performance patch mitigations use data-dependent truncation (e.g., "x &=(lenb-1)"), rather than fence instructions. An attacker regains arbitrary read access by overwriting either the base of array "b" (line 2), or its length, "lenb" (line 1).

Embodiments of the present invention invoke two distinct and independent mitigations for this variant. The first mitigation approach of the present invention for this variant uses the method 191 of FIG. 1C (as described above) to protect the victim process. Once the memory barrier instruction (FENCE or CSDB instruction) has been placed in between Line 1 and Line 2 (as described above in reference to Spectre Variant 1), if Line 4 causes a jump to Line 2, then effectively control is being transferred to a region where the FENCE is located and not to the original branch. As the victim process executes in real time, the method 191 detects that the transition from Line 4 has caused a jump to the FENCE or CSDB instruction. This is a signal of a Spectre 1.1 style attack. Using the monitoring instructions, method 191 may further detect and report this jump to the memory barrier instruction to a user as a potential attack.

The second mitigation approach of the present invention for this variant uses the method 192 of FIG. 1D and method 194 of FIG. 1F (as described above) to detect and prevent the attacker process from exploiting such vulnerabilities of the speculative execution engine.

Spectre 1, Subvariant 2 (CVE-2018-3639)

In Meltdown, the attacker process relies on lazy enforcement of User/Supervisor protection flags for page-table entries (PTEs). The same mechanism can also be used to bypass the Read/Write PTE flags (read only protection bypass). This variant of Spectre (Spectre 1.2) is a minor variant of Spectre 1.1 which depends on lazy PTE enforcement, similar to Meltdown. In a Spectre 1.2 attack, speculative stores are allowed to overwrite read-only data, code pointers, and code metadata, including vtables, GOT/Implicit Association Test (IAT), and control-flow mitigation metadata. As a result, sandboxing that depends on hardware enforcement of read-only memory is rendered ineffective. See See Vladimir Kiriansky and Carl Waldspurger, "Speculative Buffer Overflows: Attacks and Defenses," arXiv:1807.03757 (https://arxiv.org/abs/1807.03757), 2018 for further information on this subvariant.

Embodiments of the present invention invoke two distinct and independent mitigations for this variant. The first mitigation approach of the present invention for this variant uses the method 191 of FIG. 1C (described above) to protect the victim process. Once the memory barrier instruction (FENCE or CSDB instruction) has been placed in between Line 1 and Line 2 (as described above in reference to Spectre Variant 1), if Line 4 causes a jump to Line 2, then effectively control is being transferred to a region where the FENCE is located and not to the original branch. As the victim process executes in real time, the method 191 detects that the transition from Line 4 has caused a jump to the FENCE or CSDB instruction. This is a signal of a Spectre 1.1 style attack. Using the monitoring instructions, method 191 may further detect and report this jump to the memory barrier instruction to a user as a potential attack.

The second mitigation approach of the present invention for this variant uses the method 192 of FIG. 1D and method 194 of FIG. 1F (as described above) to detect and prevent the attacker process from exploiting such vulnerabilities of the speculative execution engine.

Spectre Variant 3a (CVE-2018-3640)

A rogue system register read, as described as Variant 3a "Cache Speculation Side-channels" whitepaper, version 1.3, dated May 2018, uses both speculative execution and side channel cache methods to infer the value of some processor system register state, which is not architecturally accessible by the attacker processor. The rogue system register read uses speculative execution of instructions that read system register state while the processor is operating at a mode or privilege level that does not architecturally allow the reading of that state. The set of system registers that can have their value inferred by this attack is implementation-specific. Although these operations will architecturally fault or the virtual machine (VM) executing these operation exit, in certain cases, the operations may return data accessible to subsequent instructions in the speculative execution path. The subsequent instructions can then create a side channel to infer the system register state. See "Intel Analysis of Speculative Execution Side Channels," White Paper, Revision 3, Intel, Document Number: 336983-003, May 2018 for further information on this variant.

The mitigation approach of the present invention for this variant uses the method 192 of FIG. 1D and method 194 of FIG. 1F (as described above) to detect and prevent the attacker process from exploiting such vulnerabilities of the speculative execution engine.

Spectre Variant 4

In their blog post (https://blogs.technet.microsoft.com/srd/2018/05/21/analysis-and-mitigation-of-speculative-store-bypass-cve-2018-3639/) on mitigating speculative execution side channel hardware vulnerabilities, Microsoft described three speculation primitives that can be used to create the conditions for a speculative execution side channel. These three primitives provide the fundamental methods for entering speculative execution along a non-architectural path and consist of conditional branch misprediction, indirect branch misprediction, and exception delivery or deferral. Speculative Store Bypass (SSB) belongs to a fourth new category of speculation primitive that MS refer to as memory access misprediction.

SSB arises due to a CPU optimization that can allow a potentially dependent load instruction to be speculatively executed ahead of an older store. Specifically, if a load is predicted as not being dependent on a prior store, then the load can be speculatively executed before the store. If the prediction is incorrect, this can result in the load reading stale data and possibly forwarding that data onto other dependent micro-operations during speculation. This can potentially give rise to a speculative execution side channel and the disclosure of sensitive information.

To illustrate how this might occur, it may help to consider the following simple example. In this example, RDI and RSI are assumed to be equal to the same address on the architectural path.

```
01: 88040F        mov [rdi+rcx],al
02: 4C0FB6040E    movzx r8,byte [rsi+rcx]
03: 49C1E00C      shl r8,byte 0xc
04: 428B0402      mov eax,[rdx+r8]
```

In this example, the MOV instruction on line 1 may take additional time to execute (e.g. if the computation of the address expression for RDI+RCX is waiting on prior instructions to execute). If this occurs, the CPU may predict that the MOVZX on line 2 is not dependent on the MOV and may speculatively execute it ahead of the MOV that performs the store. This can result in stale data from the memory located at RSI+RCX being loaded into R8 and fed to a dependent load on line 4. If the byte value in R8 is sensitive, then it may be observed through a side channel by leveraging a cache-based disclosure primitive, such as FLUSH+RELOAD (if RDX refers to shared memory) or PRIME+PROBE. The CPU will eventually detect the misprediction and discard that state that was computed, but the data that was accessed during speculation may have created residual side effects in the cache by this point that can then be measured to infer the value that was loaded into R8.

This example is simplified for the purposes of explaining the issue, but it is possible for similar sequences to exist where SSB could give rise to a speculative out-of-bounds read, type confusion, indirect branch, and so on. In practice, finding an exploitable instance of this variant requires an attacker process to identify an instruction sequence according to the following. The sequence is reachable across a trust boundary, e.g. an attacker in user mode can trigger the sequence in kernel mode through a system call. The sequence contains a load instruction that is architecturally dependent on a prior store instruction. The stale data that is read by the load instruction is sensitive and is used in a way that can create a side channel on the non-architectural path, e.g. the data feeds a disclosure gadget. The store instruction does not execute before the load instruction, and the dependent instructions that compose the disclosure gadget are speculatively executed.

The first mitigation approach of the present invention for this variant (protecting the victim process) uses the method 191 of FIG. 1C (as described above) to protect the victim process. For this mitigation approach, the method 191 specifically adds the memory barrier instruction of LFENCE or SSBB) between a store instruction and load instruction as shown in the example below.

```
01: 88040F        mov [rdi+rcx],al
02: 0FAEE8        LFENCE
02: 4C0FB6040E    movzx r8,byte [rsi+rcx]
03: 49C1E00C      shl r8,byte 0xc
04: 428B0402      mov eax,[rdx+r8
```

The mitigation approach for this variant uses the method 192 of FIG. 1D and method 194 of FIG. 1F (as described above) to detect and prevent the attacker process from exploiting such vulnerabilities of the speculative execution engine.

Spectre RSB

On modern processors, sophisticated branch predictors 163 are used to predict the direction and target of conditional and indirect branches and calls. Return instructions challenge such predictors because the return address depends on the call location from which a function invoked, which for many functions that are called from different locations of a program can lead to poor branch predictor performance. For example, consider a function such as printf( ) which may be called from many different locations of a program. Relying on the previous history of where it returned to can lead to very low prediction performance through the branch predictor. See Koruyeh et al., "Spectre Returns! Speculation Attacks using the Return Stack Buffer" CCS '18 Proceedings of the 2018 ACM SIGSAC Conference on Computer and Communication Security, pages 2109-2122, 2018 for further information on this variant.

To overcome this problem, the return address is predicted using the Return Stack Buffer (RSB) as follows. The RSB is a hardware stack buffer where the processor pushes the return addresses every time a call instruction is executed and uses that as a return target prediction when the matching return is encountered. FIG. 1H shows an example of the state of the RSB after two function calls (F1 and F2) that have been executed. FIG. 1H in pane (a) shows the state of the software stack for the program where the stack frame information and the return address of the function are stored. FIG. 1H in the pane (b) shows how the values on these stacks are used when the return instruction from function F2 is executed. At this point, the return address from the fast shadow stack is used to speculate about the return address location quickly. The instructions executed at this point are considered speculative. Meanwhile, the return address is fetched from the software stack as part of the teardown of the function frame. The return address is potentially in main memory (not cached) and is received several hundred cycles later. Once the return address from the software stack is resolved, the result of the speculation is determined: if it matches the value from the RSB, the speculated instructions can be committed. If it does not, then a mis-speculation has occurred, and the speculatively executed instructions must be squashed. This behavior is like speculation through the branch predictor, except it is triggered by return instructions. Note that the mis-speculation window could be substantially larger since the return could be issued out of order, and other dependencies have to be resolved before it is committed.

On Intel's processors an underfill condition in RSB occurs when the RSB is empty causing the processor to speculate the return address through the branch predictor instead. Thus, defenses deployed to protect indirect branches against Spectre 2 fail in this situation since return instructions can cause a mis-speculation through the branch predictor. To counter this situation, Skylake+processors also implement RSB refilling (a software patch): every time there is a switch into the kernel, the RSB is intentionally filled with the address of a benign delay gadget (similar to Retpoline) to avoid the possibility of mis-speculation. RSB refilling therefore interferes with SpectreRSB, although it was designed for a completely different purpose. However, note that all Core i7 processors prior to Skylake are not patched with RSB refilling and that different processor lines, importantly including the Intel Xeon which are the primary platform used on Intel-based cloud computing systems and servers, are also unpatched, leaving them vulnerable to SpectreRSB.

When the RSB "stack" is empty on these processors, a RET instruction may speculate based on the contents of the indirect branch predictor, the structure that retpoline is designed to avoid. This means that defenses around "retpoline" become useless. The RSB may become empty under the following conditions. One condition is Call stacks deeper than the minimum RSB depth (16) may empty the RSB when executing RET instructions. This includes CALL instructions and RET instructions within aborting TSX transactions. Intel Transactional Synchronization eXtensions (TSX) is the product name for two x86 instruction set extensions, called Hardware Lock Elision (HLE) and Restricted Transactional Memory (RTM). RTM is an extension adding several instructions to the instruction set that are used to declare regions of code that should execute as part of a hardware transactions. Another condition is Indirect Branch Predictor Barrier (IBPB) command may empty the RSB. Note, HLE is a set of prefixes that can be added to specific instructions. These prefixes are backward-compatible so that code that uses them also works on older hardware. A further condition is SGX instructions (ENCLS, ENCLU) and SGX CPUID leaf. Another condition is Imbalance between CALL instructions and RET instructions that leads to more RET instructions than CALL instructions, such as OS context switch, C++ exception, and longjmp. A further condition is Entering sleep state of C6 or deeper (for example, MWAIT) may empty the RSB.

The depth of the call stack may depend on many factors that are not known until runtime which makes the call stack difficult to mitigate in software. However, exploiting a deep call stack is expected to require much more comprehensive control and prediction of the behavior of the CPU and program state than a traditional branch target injection (Spectre variant 2) attack. The attacker process aims to cause the RSB stack to become empty at which point further attempts to speculation will be based on the indirect branch predictor. Once the speculation execution engine uses the indirect branch predictor, Spectre 2 attacks become possible.

One common mitigation for all side channel attacks is to not let any rogue executable or library run. This ensures abusive side channel processes are unable to run.

One mitigation approach of the present invention (protecting the victim process) for this variant uses the method 193 of FIG. 1E (as described above) to protect the victim process. The method 193 of FIG. 1E may further track and maintain a count based on how many times indirect branch transitions associated to the victim process on a given thread has occurred, which allows the method 193 to determine if the branch transition took place speculatively or not. If the count of indirect branches on a given thread is beyond a threshold level (indicated the indirect branches are being mis-predicted), the method 191 terminates the victim process or given thread.

Figure 1G:
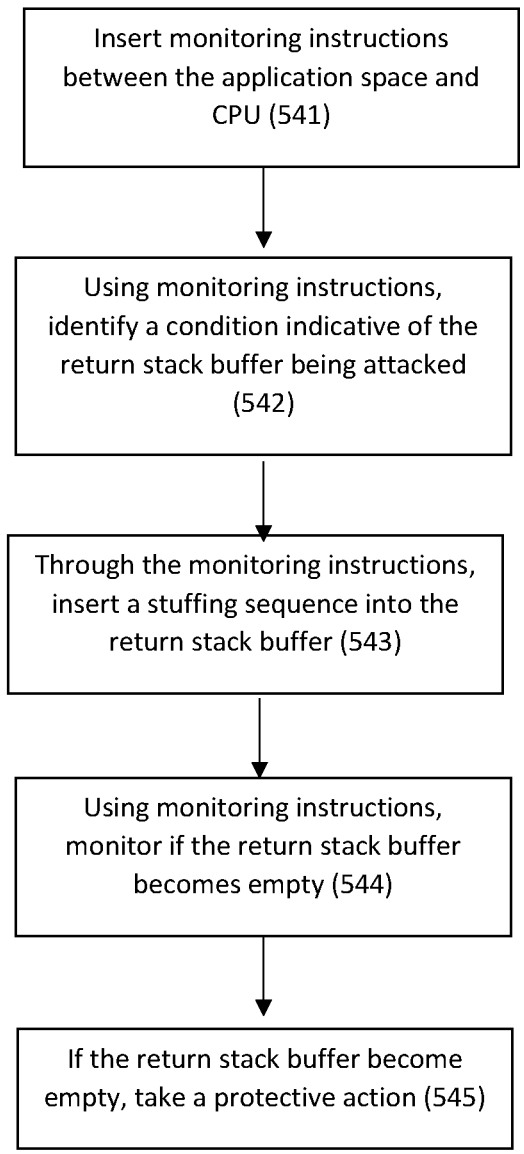
Figure 1H:
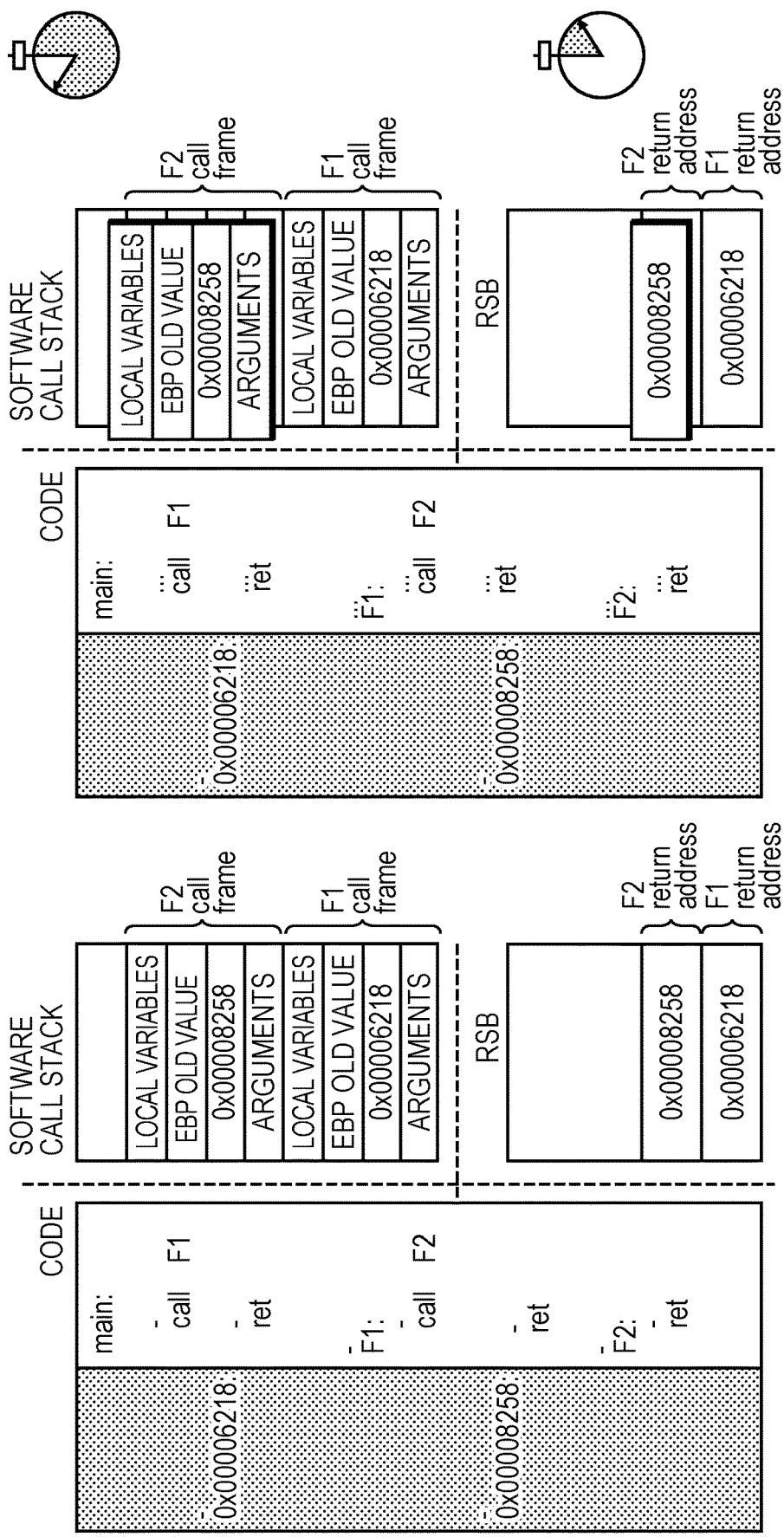
FIG. 1H illustrates an example of how the Return Stack Buffer (RSB) is exploited in some embodiments of the present disclosure.

A second mitigation approach of the present invention for this variant (to protect the victim process) is shown in the method 195 of FIG. 1G. The method 195 inserts 541 monitoring instructions between the application space and CPU. Using the monitoring instructions, as the application executes, the method 195 identifies 542 a condition indicative of the vulnerability of the return stack buffer being attacked by an attacker process. The condition includes one of interrupts/NMIs/traps/aborts/exceptions which increase call depth, System Management Interrupts (SMI), Host VMEXIT/VMRESUME/VMENTER, and Microcode update load (WRMSR 0x79) on another logical processor of the same core. In response, through the monitoring instructions, the method 195 dynamically insert 543 a RSB stuffing sequence (e.g., address of a benign delay gadget/instruction) into the RSB (e.g., in the application code) to mitigate the return stack buffer from becoming empty.

Using the monitoring instructions, the method 195 further monitors 544 if the RSB becomes empty (and the application will be resorting to the Indirect Branch Predictor). The following activity causes the RSB Stack to become empty: excessive TSX aborts, Write WRMSR to 0x79 (microcode update), 0x7A (SGX activation), WRMSR/RDMSR to/from 0x8C-0x8F (SGX Launch Enclave Public Key Hash), SGX instructions (ENCLS, ENCLU) and SGX CPUID leaf, Excessive number of OS Context Switches, Excessive number of user space exceptions, Excessive calls to longjmp( ) and Excessive invocation of sleep state of C6 or deeper. If the return stack buffer becomes empty, the method 195 takes 545 a protective action, such as terminates the attacker process, moves the attacker process to a quarantine area, restores a valid copy of the process file, load one or more patches to remedy the process file, and report the process as malicious to the user.

Another mitigation approach of the present invention for this variant uses the method 193 of FIG. 1E (described above) to protect the victim process.

A further mitigation approach of the present invention for this variant uses the method 192 of FIG. 1D and method 194 of FIG. 1F (as described above) to detect and prevent the attacker process from exploiting such vulnerabilities of the speculative execution engine. Foreshadow Intel Software Guard Extensions (SGX) Enclave Compromise (CVE-2018-3615)

It becomes inherently difficult to place trust in modern, widely used operating systems and applications whose sizes can easily reach millions of lines of code, and where a single vulnerability can often lead to a complete collapse of all security guarantees. In response to these challenges, recent research and industry efforts led to the development of Trusted Execution Environments (TEEs) that feature an alternative, non-hierarchical protection model for isolated application compartments called enclaves. See Bulck et al., "FORESHADOW: Extracting the Keys to the Intel SGX Kingdom with Transient Out-of-Order Execution," SEC '18 Proceedings of the 27$^{th}$ USENIX Conference on Security Symposium, pages 991-1008, 2018 for further information on this variant.

TEEs enforce the confidentiality and integrity of mutually distrusting enclaves with a minimal Trusted Computing Base (TCB) that includes only the processor package and microcode. Enclave-private CPU and memory state is exclusively accessible to the code running inside it and remains explicitly out of reach of all other enclaves and software running at any privilege level, including a potentially malicious operating system and/or hypervisor. Besides strong memory isolation, TEEs typically offer an attestation primitive that allows local or remote stakeholders to cryptographically verify at runtime that a specific enclave has been loaded on a genuine (and hence presumed to be secure) TEE processor.

The foreshadow attack leverages a speculative execution bug in recent Intel x86 processors to reliably leak plaintext enclave secrets from the CPU cache. At its core, the foreshadow attack abuses the same processor vulnerability as the Meltdown attack, i.e., a delicate race condition in the CPU's access control logic that allows an attacker to use the results of unauthorized memory accesses in transient out-of-order instructions before they are rolled back. Importantly, however, whereas Meltdown targets traditional hierarchical protection domains, foreshadow attack considers a very different attacker model where the adversary's goal is not to read kernel memory from user space, but to compromise state-of-the-art intra-address space enclave protection domains that are not covered by recently deployed kernel page table isolation defenses. Foreshadow attacks can be entirely mounted by an unprivileged adversary without root access to the victim machine. Despite SGX's ambition to defend against strong kernel-level adversaries, present SGX processors cannot even safeguard enclave secrets in the presence of unprivileged user space attackers.

One mitigation approach of the present invention (protecting the victim process) for this variant uses the method 193 of FIG. 1E (as described above) to protect the victim process. The method 193 of FIG. 1E may further track and maintain a count based on how many times indirect branch transitions associated to the victim process on a given thread has occurred, which allows the method 193 to determine if the branch transition took place speculatively or not. If the count of indirect branches on a given thread is beyond a threshold level (indicated the indirect branches are being mis-predicted), the method 191 terminates the victim process or given thread.

Figure 1I:
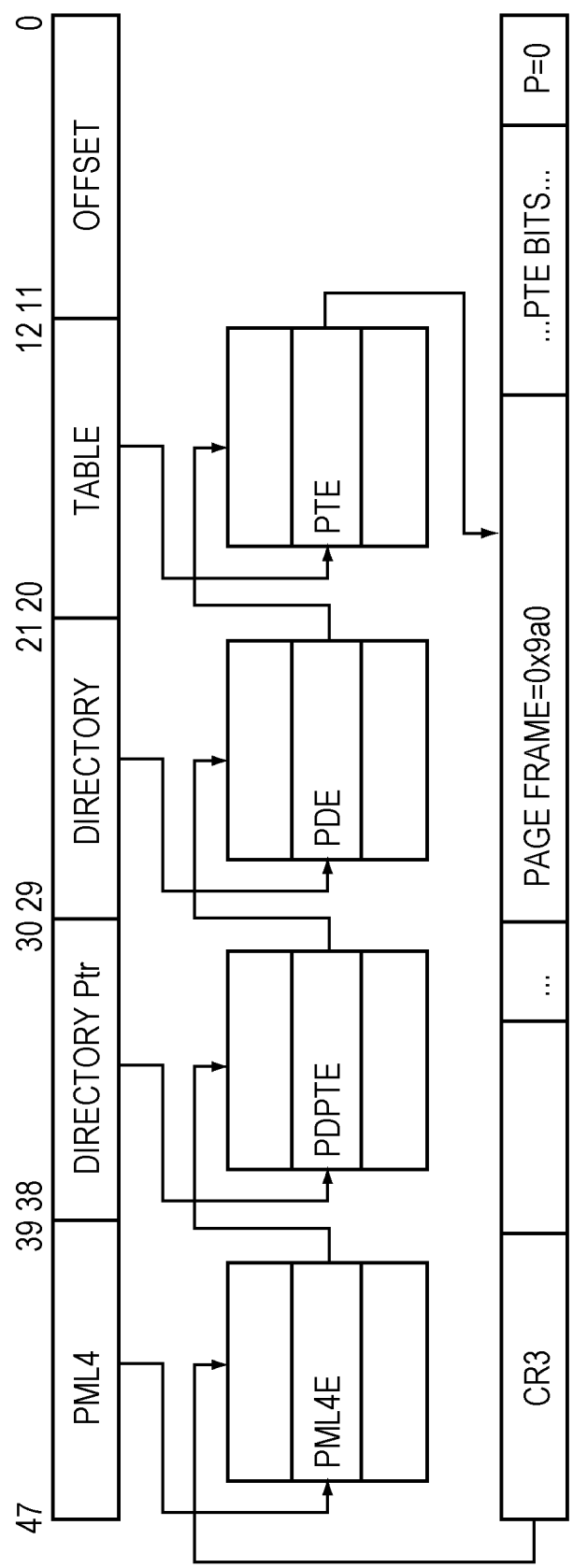
FIG. 1I illustrates an example of how the handling of address translations is exploited in some embodiments of the present disclosure.

A second mitigation approach of the present invention for this variant (to protect the victim process) is shown in the method 195 of FIG. 1I. The method 195 inserts monitoring instructions between the application space and CPU 541. Using the monitoring instructions, as the application executes, the method 195 identifies 542 a condition indicative of the vulnerability of the return stack buffer being attacked by an attacker process. The condition includes one of interrupts/NMIs/traps/aborts/exceptions which increase call depth, System Management Interrupts (SMI), Host VMEXIT/VMRESUME/VMENTER, and Microcode update load (WRMSR 0x79) on another logical processor of the same core. In response, through the monitoring instructions, the method 195 dynamically insert 543 a "RSB stuffing" sequence into the RSB (e.g., in the application code) to mitigate the return stack buffer from becoming empty.

Using the monitoring instructions, the method 195 further monitors 544 if the RSB becomes empty (and the application will be resorting to the Indirect Branch Predictor). The following activity causes the RSB Stack to become empty: excessive TSX aborts, Write WRMSR to 0x79 (microcode update), 0x7A (SGX activation), WRMSR/RDMSR to/from 0x8C-0x8F (SGX Launch Enclave Public Key Hash), SGX instructions (ENCLS, ENCLU) and SGX CPUID leaf, Excessive number of OS Context Switches, Excessive number of user space exceptions, Excessive calls to longjmp( ) and Excessive invocation of sleep state of C6 or deeper. If the return stack buffer becomes empty, the method 195 takes 545 a protective action, such as terminates the victim or attacker process, moves the process to a quarantine area, restores a valid copy of the process file, load one or more patches to remedy the process file, and report the process as malicious to the user.

Another mitigation approach for this variant uses the method 192 of FIG. 1D and 194 of FIG. 1F (as described above) to detect and prevent the attacker process from exploiting such vulnerabilities of the speculative execution engine.

Foreshadow-NG-1 (aka L1TF-NG-1-IntraOS) (CVE-2018-3620) and

Foreshadow-NG-2 (aka L1TF-NG-2-InterVM) (CVE-2018-3646)

Each category below provides a fundamental method for entering speculative execution along a non-architectural path, specifically: conditional branch misprediction, indirect branch misprediction, exception deliver); or deferral, memory access misprediction. L1TF belongs to the exception delivery or deferral category of speculation primitives (along with Meltdown and Lazy FP State Restore) as it deals with speculative (or out-of-order) execution related to logic that generates an architectural exception. See "Resource And Response To Side Channel L1 Terminal Fault," https://www.intel.com/content/www/us/en/architecture-and-technology/lltfhtml, pages 1-10, 2019 for further information on these variants.

L1TF arises due to a CPU optimization related to the handling of address translations when performing a page table walk. When translating a linear address, the CPU may encounter a terminal page fault which occurs when the paging structure entry for a virtual address is not present (Present bit is 0) or otherwise invalid. This will result in an exception, such as a page fault, or TSX transaction abort. along the architectural path. However, before either of these occur, a CPU that is vulnerable to L1TF may initiate a read from the L1 data cache for the linear address being translated. For this speculative-only read, the page frame bits of the terminal (not present) page table entry are treated as a system physical address, even for guest page table entries. If the cache line for the physical address is present in the L1 data cache, then the data for that line may be forwarded on to dependent operations that may execute speculatively before retirement of the instruction that led to the terminal page fault. The behavior related to can occur for page table walks involving both conventional and extended page tables (the latter of which is used for virtualization).

To illustrate how this might occur, it may help to consider the following simplified example. In this example, an attacker-controlled virtual machine (VM) has constructed a page table hierarchy within the VM with the goal of reading a desired system (host) physical address. The following diagram provides an example hierarchy for the virtual address 0x12345000 where the terminal page table entry is not present but contains a page frame of 0x9a0 as shown in FIG. 1I. After setting up this hierarchy, the VM could then attempt to read from system physical addresses within [0x9a0000, 0x9a1000) through an instruction sequence such as the following:

```
01: 4C0FB600      movzx r8.byte [rax] ; rax = 0x12345040
02: 49C1E00C      shl r8,byte 0xc
03: 428B0402      mov eax,[rdx+r8] ; rdx = address of signal array
```

By executing these instructions within a TSX transaction or by handling the architectural page fault, the VM could attempt to induce a speculative load from the L1 data cache line associated with the system physical address 0x9a0040 (if present in the L1) and have the first byte of that cache line forwarded to an out-of-order load that uses this byte as an offset into a signal array. This would create the conditions for observing the byte value using a disclosure primitive such as FLUSH+RELOAD, thereby leading to the disclosure of information across a security boundary in the case where this system physical address has not been allocated to the VM. While the scenario described above illustrates how L1TF can apply to inferring physical memory across a virtual machine boundary (where the VM has full control of the guest page tables), it is also possible for L1TE to be exploited in other scenarios. For example, a user mode application could attempt to use L. IT to read from physical addresses referred to by not present terminal page table entries within their own address space. In practice, it is common for operating systems to make use of the software bits in the not present page table entry format for storing metadata which could equate to valid physical page frames. This could allow a process to read physical memory not assigned to the process (or VM, in a virtualized scenario) or that is not intended to be accessible within the process (e.g. PAGE_NOACCESS memory on Windows).

One mitigation approach of the present invention for this variant is as follows. Embodiments of the present invention for this variant insert monitoring instructions between the application space and CPU of the speculative execution engine. Using the monitoring instructions, the embodiments can detect security domain transitions (context switch between servicing of different processes) and, in response, dynamically flush the L1 Data Cache. The monitoring instructions also monitor for (detect) excess TSX aborts and terminates the victim process if excessive TSX aborts are detected. The embodiments may apply rule-based policies based on security technical implementation guides (STIGS) or user configuration to monitor TSX aborts and context switching between processes, clear the cache, and terminate the victim process.

Another mitigation approach of the present invention for this variant uses the method 192 of FIG. 1D and method 194 of FIG. 1F (as described above) to detect and prevent the attacker process from exploiting such vulnerabilities of the speculative execution engine.

Spectre NG3 (CVE-2018-3665) Lazy FPU State Restore

Modern processors utilize an increasingly large register set to facilitate efficient floating point and SIMD computation. This large register set is a burden for operating systems, as its content needs to be saved and restored when the operating system context switches between tasks. As an optimization, the operating system can defer the context switch of the x87 floating-point unit (FPU) and single instruction, multiple data (SIMD) register set until the first instruction is executed that needs access to these registers. Meanwhile, the old content is left in place with the hope that the current task might not use these registers at all. This optimization is commonly called lazy FPU context switching. To make it possible, a processor offers the ability to toggle the availability of instructions utilizing floating point and SIMD registers. If the instructions are turned off, any attempt of executing them will generate a fault. Exploits lazy FPU context switching allows an adversary to recover the FPU and SIMD register set of arbitrary processes or VMs. The attack works on processors that transiently execute FPU or SIMD instructions that follow an instruction generating the fault indicating the first use of FPU or SIMD instructions. On operating systems using lazy FPU context switching, the FPU and SIMD register content of other processes or virtual machines can then be reconstructed via cache side effects. See Stcklina et al., "LazyFP: Leaking FPU Register State using Microarchitectural Side-Channels," arXiv: 1806.07480 ((https://arxiv.org/abs/1806. 07480), 2018 for further information on this variant.

With SIMD registers not only being used for cryptographic computation, but also increasingly for simple operations, such as copying memory, as such lazy FPU context switching is a dangerous optimization that needs to be turned off in all operating systems, if there is a chance that they run on affected processors. In contrast to Meltdown, the researchers exploit the behavior of recent Intel processors when they encounter a Device Not Available (#NM) exception instead of a Page Fault (#PF) exception. This exception is used to implement a context switch optimization called lazy FPU context switching. Speculative instruction execution can lead to full recovery of the FPU register state of a victim process using unprivileged local code execution in combination with this optimization.

One example attack scenario is a simple x86 assembly program for a one-bit leak. It reads the lower-half of the SSE registers xmm0 into the rax general purpose register. It then masks the lowest bit and shifts it by 6 to be either 0 or 64 depending on the input value. This calculated offset is used to write to memory. On a system with 64-byte cache lines, the write operation will touch one of two cache lines depending on bit 0 of the xmm0 register. The basic building block of the LazyFP attack is as follows:

movq rax, xmm0
   and rax, 1
   shl rax, 6
   mov dword [mem+rax], 0

The FPU register access executes speculatively with the previous process' FPU register set. The execution is retried once the operating system kernel handles the #NM exception generated by the first instruction. Assuming the FPU registers being owned by the victim process due to lazy FPU context switching, the movq instruction generates a #NM fault to indicate to the operating system that the FPU is disabled. The operating system will transparently handle this fault, restore the register state of the current process and continue execution. The interesting part happens before the processor retires the movq and generates the #NM fault. It has already executed the subsequent instructions speculatively. The architectural changes caused by these instructions is discarded, but their microarchitectural footprint in the cache is not. A speculative execution of the code with the victim's FPU register set and the regular execution with the attacker's register set. Assuming that the attacker set xmm0 to zero and flushed mem+64 from the processor cache, he can now recover the victim's bit by probing the access latency of this memory location. While this attack can be repeated to leak arbitrary bits from arbitrary registers, in this simple form it is not practical. Each attempt at leaking needs to be preceded by letting the victim run. This is necessary to move ownership of the FPU back to the victim, but it also means the victim will likely change its register content rendering the results hard to use.

One mitigation approach of the present invention for this variant is as follows. Embodiments of the present invention for this variant insert monitoring instructions between the application space and CPU of the speculative execution engine. Using the monitoring instructions, the embodiments check the BIOS setting of "eagerfpu=on", which ensure that the host platform is not susceptible to the Lazy FPU State Restore vulnerability. If this BIOS setting is not set to "on", using the monitoring instructions, the embodiments dynamically change this BIOS setting to "on". The embodiments may apply rule-based policies based on security technical implementation guides (STIGS) or user configuration to check and change the BIOS setting.

Another mitigation approach of the present invention for this variant uses the method 192 of FIG. 1D and method 194 of FIG. 1F (as described above) to detect and prevent the attacker process from exploiting such vulnerabilities of the speculative execution engine.

BranchScope (CVE-2018-9056) Pattern History Table Attack

Modern microprocessors rely on branch prediction units (BPUs) to sustain uninterrupted instruction delivery to the execution pipeline across conditional branches. When multiple processes execute on the same physical core, they share a single BPU. While attractive from utilization and complexity considerations, the sharing potentially opens the door an attacker to manipulate the shared BPU state, create a side-channel, and derive a direction or target of a branch instruction executed by a victim process. Such leakage can compromise sensitive data. For example, when a branch instruction is conditioned on a bit of a secret key, the key bits are leaked directly. This occurs in implementations of exponentiation algorithms and other key mathematical operations of modern cryptographic schemes. The attacker may also change the predictor state, changing its behavior in the victim. See Evtyushkin et al., "BranchScope: A New Side-Channel Attack on Directional Branch Predictor," Proceedings of 2018 Architectural Support for Programming Languages and Operating Systems, ACM, New York, NY, 15 pages, 2018 for further information on this variant.

On modern microprocessors, the BPU is composed of two structures: the branch target buffer (BTB) and the directional predictor. Previous work has specifically targeted the BTB to create side channels. In the BTB, the target of a conditional branch is updated only when the branch is taken; this can be exploited to detect whether or not a particular victim branch is taken. The first attack in this area proposed several BTB-based attacks that are based on filling the BTB by the attacker, causing the eviction of entries belonging to the victim. By observing the timing of future accesses, the attacker can infer new branches executed by the victim. The researchers describe those attacks and their limitations in the related work section. A side-channel attack is proposed on the BTB that creates BTB collisions between the victim and the attacker processes, thus allowing the attacker to discover the location of a particular victim's branch instruction in the address space, bypassing address space layout randomization. Another researcher, Lee et al. built on that work by exploiting the BTB collisions to also discover the direction of the victim's branch instructions. They demonstrated the attack in kernel space against Intel SGX enclaves.

Researchers propose a new micro-architectural side channel attack, which they called BranchScope, that targets the directional predictor as the source of information leakage. BranchScope is the first attack exploiting the directional predictor structure, showing that BPUs can be vulnerable even if the BTB is protected. BranchScope works by forcing collisions between the attacker and selected victim branches and exploiting these collisions to infer information about the victim branch. This attack has new challenges not present in a BTB attack. In order to achieve collisions, the unpredictability of the complex hybrid prediction mechanisms used in modern CPUs must be overcome. BranchScope overcomes this by generating branch patterns that force the branch predictor to select the local one-level prediction even when complex multi-level predictors are present in the processor. Second, after collisions are reliably created, the victim's branch direction can be robustly disclosed by an attacker executing a pair of branches with predefined outcomes, measuring the prediction accuracy of these branches, and correlating this information to the predictor state and thus to the direction of the victim's branch.

Modern branch predictors are typically implemented as a composition of: a simple one-level bimodal predictor indexed directly by the program counter. It is more commonly referred to as the 1-level predictor, and a gshare-style 2-level predictor. The gshare-like predictor exploits the observation that the branch outcome depends on the results of recent branches, and not only on the address of the branch.

Figure 1J:
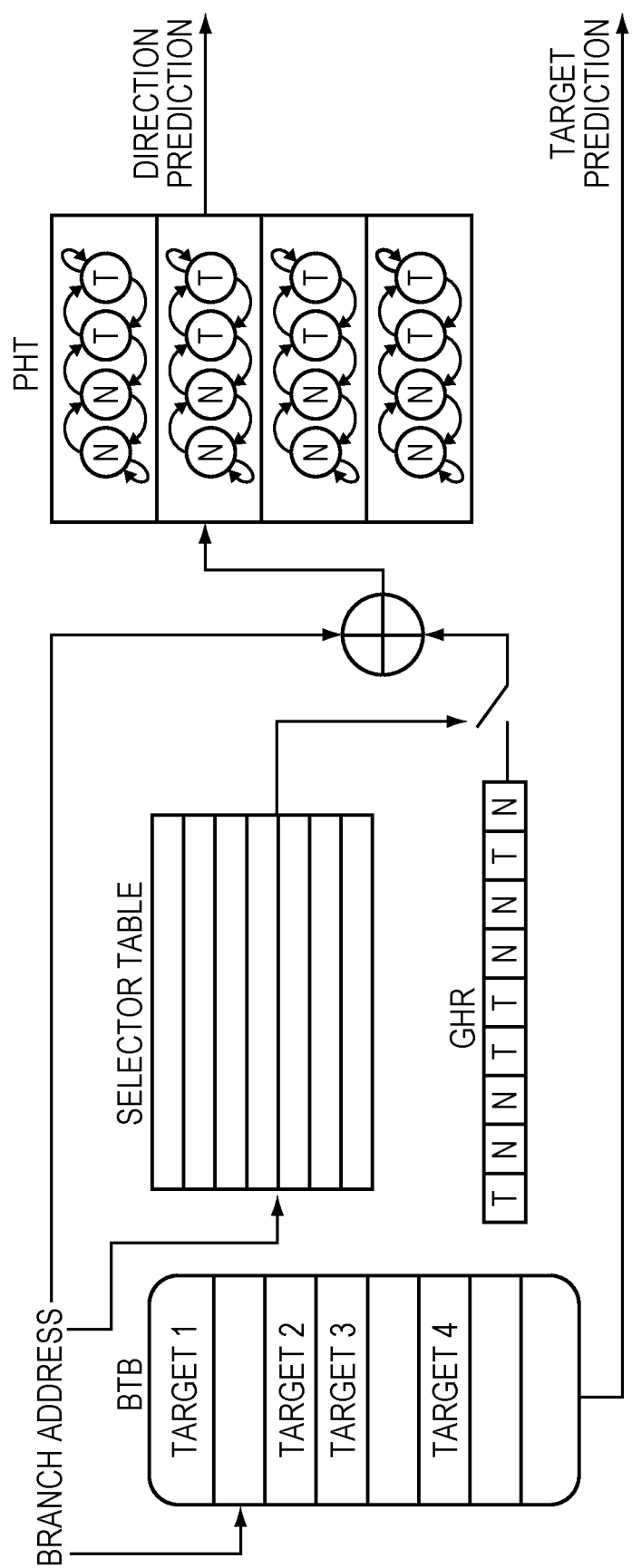
FIG. 1J illustrates an example of how BranchScope targets the direction prediction unit of the branch prediction units (BPU) in some embodiments of the present disclosure.

A selector table indexed by the branch address identifies which predictor is likely to perform better for a branch based on the previous behavior of the predictors. This design combines the best features of both component predictors. The figure below illustrates one possible design of such a hybrid predictor. The 1-level predictor stores its history in the form of a 2-bit saturating counter in a pattern history table (PHT). The gshare predictor has a more complex indexing scheme that combines the program counter with the global history register (GHR). The GHR records the outcomes of the last several branches executed by the program. The branch history information is also stored in the PHT using a 2-bit saturating counter; the only difference between the two predictors is how the PHT is indexed. If the branch is predicted to be taken, the target address of the branch is obtained from a structure called the Branch Target Buffer (BTB), which is a simple direct mapped cache of addresses that stores the last target address of a branch that maps to each BTB entry. Published side channel attacks on the BPU have all targeted the BTB. In contrast, BranchScope targets the direction prediction unit of the BPU as shown in FIG. 1J.

In general, the attack proceeds as follows: Stage 1: Prime the PHT entry. In this stage, the attacker process primes a targeted PHT entry into a specified state. This priming is accomplished by executing a carefully-selected randomized block of branch instructions. This block is generated one-time, a-priori by the attacker. Stage 2: Victim execution. Next, the attacker initiates the execution of a branch it intends to monitor within the victim process and waits until the PHT state is changed by the victim's activity. Stage 3: Probe the PHT entry. Finally, the attacker executes more branch instructions targeting the same PHT entry as the victim while timing them to observe their prediction outcomes. The attacker correlates the prediction outcomes with the state of the PHT to identify the direction of the victim's branch. The attacker must be able to cause collisions between its branches and the branches of the victim process in the PHT. These collisions, given knowledge of the operation of the predictor, allow the attacker to uncover the direction of the victim's branch. Specifically, by observing the impact of that branch (executed in stage 2 above) on the prediction accuracy of an attacker's probing branches executed in stage 3. If the PHT indexing is strictly determined by the instruction address (as in the 1-level predictor), creating collisions in the PHT between the branches of two processes is straightforward, since the virtual addresses of victim's code are typically not a secret. If address space layout randomization (ASLR) is used to randomize code locations, the attacker can de-randomize using data disclosure, or side channel attacks on ASLR.

The attack relies on generating collisions within the predictor. Creating collisions is greatly simplified if the predictor in use is the simply indexed 1-level predictor instead of the more complex gshare-like predictor. The attack must force both the attack code and the victim code to use the 1-level predictor. This is accomplished using the Prime+Probe Strategy described below. The observation that new branches use the 1-level predictor directly in the attacker code to force the use of the 1-level predictor: The observation that new branches use the 1-level predictor directly in the attacker code to force the use of the 1-level predictor is observed by cycling through a number of branches placed at addresses that collide with the victim branch (if that also uses the 1-level predictor) in the branch predictor, such that at any time the attack branch being used does not exist in the BPU, forcing the unit to use the 1-level predictor.

The more difficult task is to force the victim code to use the 1-level predictor; the victim code is not under the control of the attacker. To force the BPU to use the 1-level predictor for the targeted victim branch, the attacker needs to accomplish one of two goals: 1) ensure that the branches used by the attack have not been recently encountered, thus starting the prediction for these branches from the 1-level mode; 2) make the 2-level predictor inaccurate and prolong its training time, forcing the selector to choose the 1-level mode at least for several branches. Thus, the attacker must ensure that at least one of these two properties (if not both) hold to force the victim code to use the 1-level predictor. This goal is accomplished by developing a sequence of branch-intensive code that the attacker executes to drive the BPU to a state that lowers the 2-level predictor accuracy and potentially replaces the victim branches. As a result of executing this sequence, the victim code will use the 1-level predictor when it executes its branch, enabling us to achieve collisions. This code serves another critical function: it forces the PHT entries to a desired state that enables us to reliably detect the branch outcome per the operation of the prediction FSM (reverse engineered in the next section). To maximize its efficiency, the randomizing code has to have two properties. First, the executed branches must not contain any regular patterns predictable by the 2-level predictor. To this end, the directions of branches in the code are randomly picked with no inter-branch dependencies. Second, the code must affect a large number of entries inside the PHT. This is accomplished by executing a large number of branch instructions and randomizing memory locations of the these instructions by either placing or not placing a NOP instruction between them. The outcome patterns are randomized only once (when the block is generated) and are not re-randomized during execution. These manipulations with the branch predictor must be performed before the victim executes the target branch (during stage 1 of the attack). The total number of branch instructions needed to be executed in this manner depends on the size of BPU's internal data structures on a particular CPU. It has been experimentally discovered that executing 100,000 branch instructions is sufficient to randomize the state of most PHT entries and to effectively disable the 2-level predictor. An example of such a code is presented in Listing 1. Reducing the size of this code is a topic of future research; for example, if focused only on evicting a particular branch, it may be able to come up with a shorter sequence of branches that map to the same PHT and replace that entry randomize_pht:
cmp % rcx, % rcx;
je.L0; nop; .L0: jne.L1; nop; .L1: je.L2;
. . .
.L99998: je.L99999; nop; .L99999: nop;

After the attacker forces a collision in the PHT, she still needs to be able to interpret the state of the PHT in order to determine the direction of the victim's branch. Therefore, it must be understood how to prime a PHT entry into a desired starting state in stage 1. This starting state must enable us to correlate some observable behavior of a probe operation from the attacker in stage 3 with the direction of the victim's branch.

A key functionality required for the BranchScope attack is the ability to detect branch predictor events. One approach is to use of hardware performance counters to detect the missed branches. This approach, relies on the hardware explicitly providing the branch prediction result. In order to make use of this, however, an attacker would need at least partially elevated privileges. An alternative approach is to detect branch related events by observing their effect on the CPU performance. An incorrectly predicted branch results in fetching of wrong-path instructions and significant cycles lost for restarting the pipeline. Therefore, the attacker can track the number of cycles to determine if the branch was predicted correctly. This timekeeping can be realized with rdtsc or rdtscp instructions on Intel processors. These instructions provide user processes with direct access to timekeeping hardware, bypassing system software layers. The BranchScope attack requires the attacker to detect whether a single instance of a branch execution was correctly or incorrectly predicted, rather than relying on the aggregate BPU performance. To evaluate the applicability of the rdtscp instruction as a dependable measurement mechanism for the purposes of the attack, a series of experiments are performed. First, time measurements of a single branch instruction are collected when it is correctly and incorrectly predicted for two cases: taken branch and non-taken branch. For each case, 100 000 samples were collected. A branch misprediction has a noticeable performance impact, and the effect is present regardless of the actual direction of the branch. The slowdown is clear in the individual data points, as well as in the mean values. To eliminate the impact of caching on these measurements, each branch instance are executed two times, but only recorded the latency during the second execution, after the instruction has been placed in the cache.

BranchScope can be directly leveraged to target a system that supports isolated execution, such as Intel's SGX, or be used as a general side channel attack in conventional environments. In this section, Intel SGX and attack considerations are overviewed in such an environment, then describe a series of specific attacks that can be conducted on a victim even when it is running inside of an SGX enclave. To illustrate BranchScope in an SGX environment, the researchers repeat our covert channel benchmark with the sender running inside the SGX enclave using BranchScope to communicate to a receiver outside SGX. The error rates are acceptable even in the presence of noise; however, when the OS controls the noise (by preventing other processes from running), the quality of the channel is improved. The Montgomery ladder is a popular algorithm used in modular exponentiation and scalar multiplication algorithms. Both these mathematical operations constitute the key components of traditional RSA as well as elliptic curve (ECC) implementations of public-key cryptography. Montgomery ladder is based on performing operations regardless of bit value ki in secret key k. This implementation mitigates timing and power side channels by equalizing the execution paths. However it requires a branch operating with direct dependency from the value of ki. Yarom et. al. [55] demonstrated the vulnerability of the OpenSSL implementation of ECDSA cipher using the FLUSH+RELOAD cache side channel attack. In this attack the CPU cache was used to spy on the direction of the target branch. BranchScope can directly recover the direction of such branch. Although most recent versions of cryptographic libraries do not contain branches with outcomes dependent directly on the bits of a secret key, often some limited information can still be recovered [6, 8] and many outdated libraries are still in use. Another example of how our attack can reveal sensitive information is an attack against libjpeg, a popular JPEG encoding/decoding library. The attack is possible because of the inverse cosine transform (IDCT) operation performed during decompression. In this optimization elements in rows and columns of coefficient matrices are compared to 0 to avoid costly computations. Each such comparison is realized as an individual branch instruction. By spying on these branches the BranchScope is capable of recovering information about relative complexity of decoded pixel blocks. Attacks on libjpeg were previously demonstrated using the page fault side channel [27, 54] by counting the number of times the optimization can be applied, resulting in recovery of an original image. The BranchScope attack is advantageous as it not only allows to distinguish the cases when all row/column elements are zero, but also indicates which element is not equal to zero. ASLR value recovery: BranchScope can also be used to infer control code within victim enclaves. The attacker may learn not only whether a certain branch was taken or not, but also detect the location of branch instruction in a victim's virtual memory by observing branch collisions. This allows the attacker to bypass the address space layout randomization BranchScope can also be used to infer control code within victim enclaves. The attacker may learn not only whether a certain branch was taken or not, but also detect the location of branch instruction in a victim's virtual memory by observing branch collisions. This allows the attacker to bypass the address space layout randomization (ASLR) protection. Previously, similar attacks were demonstrated using the BTB [21, 35]. As indicated by Gruss [23] the BTB-based attack does not work on recent Intel's processors. This makes the direction predictor a unique candidate for this class of attacks.

Once again there are two different approaches to BranchScope mitigation. One relates to the application and the other relates to the Side Channel attack process. Note, a process that has indirect branches can become a victim to a BranchScope attacker process. Therefore, BranchScope is similar to Spectre 2 style attacks. Since BranchScope is contingent on indirect branch prediction, a Retpoline based approach can be used to eliminate Indirect Branches altogether. The first mitigation approach of the present invention for this variant uses the method 193 of FIG. 1E for protecting the victim process. BranchScope style attacker process can be detected using the PRIME+PROBE or FLUSH+RELOAD approach which primarily relies on RDTSC abuse.

The BranchScope relies heavily on Prime+Probe and the Flush+Reload side channels. The second mitigation approach of the present invention for this variant uses the method 192 of FIG. 1D and method 194 of FIG. 1F (as described above) to detect and prevent the attacker process from exploiting such vulnerabilities of the speculative execution engine.

Systems for Defending Against Speculative Execution

Figure 2A:
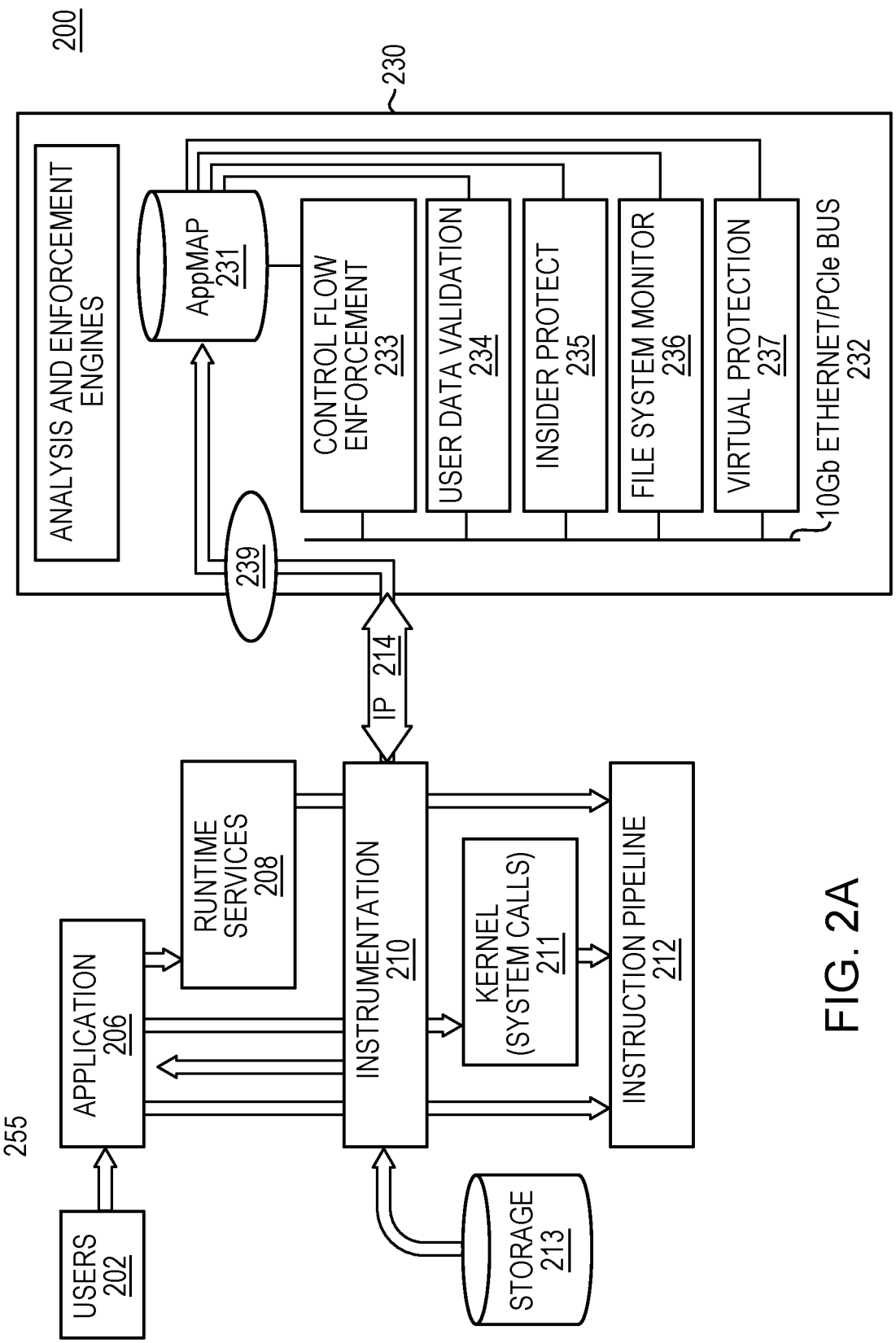
FIG. 2A illustrates an example trusted execution system for protecting an application from vulnerabilities in some embodiments of the present disclosure.

FIG. 2A illustrates an example trusted execution platform 200 for protecting an application from vulnerabilities (Spectre, Meltdown, Foreshadow, and the like). FIG. 2A prevents vulnerabilities from being exploited in the speculative execution engine of FIG. 1A. In the platform 255 of FIG. 2A, the user 202 initiates an application in a computing platform 255, such as a cloud computing platform, web services platform (e.g., web infrastructure of FIG. 2A), virtual machine (VM) platform, or any other computing platform without limitation. The computing platform 255 comprises one or more microprocessor (or other processor) that implement speculative execution to execute an application (loaded into the application space 206) of the computing platform 200. While the computing platform 255 is performing application operations, an attacker may exploit the vulnerabilities (Spectre, Meltdown, Foreshadow, and the like) of the microprocessors caused by the speculative execution.

The analysis and enforcement engines (also referred to as the application runtime monitoring and analysis (VSP) appliance) 230 implement virtual patches to the vulnerabilities as the application code executes in memory of the computing platform 255. The analysis and enforcement engines 230 analyze the code of the application (e.g., compiled code, interpreted code, binaries, and such) by AppSensors (or analysis engine) 239 as the computing platform 200 dispatches the code from the application space 206 toward a central processing unit (CPU) of the computing platform 255. To do so, the analysis and enforcement analysis and enforcement engines 230 instruments instructions 210 (configured in the appmap database 231) into the computer platform 255 by transmitting internet protocol (IP) packets via the Ethernet bus 232 over interface 214 to capture application code during execution. The instrumented instructions may be configured as part of a security monitoring agent installed at the computer platform 255 to monitor actions of processes executing at the platform 255. In FIG. 2A, the implemented instructions 210 are placed in the computing platform 200 between the runtime services 208 in the application space 206 and the instrumentation pipeline 212 communicatively coupled to the CPU. The implemented instructions 210 also have access to the kernel (system calls) 211 implemented on the computing platform 200. The analysis and enforcement engines may apply rule-based policies based on security technical implementation guides (STIGS) or user configuration used by the instrumented instructions 210 (security monitoring agent) to collect particular data (application code) and by the AppSensors 239 to analyze the data, provide patches, or take other protective measures.

Through the instrumented instructions 210, the analysis and enforcement engines 230 receive captured application code (via interface 214) the AppSensors 239 communicate with the engines 233, 234, 235, 236, and 237 to perform analysis of the captured application code. These engines include user data validation 234, insider protection 235, file system monitoring 236, and virtual protection 237. Through the instrumented instructions 210, the analysis and enforcement engines 230 may also perform control flow 233 enforcement on the application code. For example, the analysis and enforcement engines 230 (e.g., insider protection engine 235 or virtual protection engine 237) may capture (via the instrumented instructions 210), receive and analyze (via the AppSensors 239) application code for a sequence of instructions vulnerable to Spectre/Meltdown/Foreshadow exploits, such as vulnerable to out of bound access or branch target injection.

In response to detecting such a sequence of instructions, the analysis and enforcement engines 230 (e.g., insider protection engine 135 or virtual protection engine 137) may determine a disposition for the vulnerability. Based on the determined disposition, the analysis and enforcement engines 230 locate protective instructions in the appmap database 231 to patch the vulnerable application code. Through the instrumented instructions (security monitoring agent) 210, the analysis and enforcement engines 230 (via interface 214) may place protective instructions (patches) into the application code (e.g., binary code) as the application code is fetched from main processor memory 213 to the CPU cache (via the instruction pipeline 212) for execution. For example, in the case of out of bound access (Spectre variant 1), the instrumented instructions 210 may place a protective fence instruction to prevent the application from executing out of order by the speculative execution engine. For another example, in the case of branch target injection (Spectre variant 2), the instrumented instructions 210 may change indirect jump instructions into direct call instructions. Through the instrumented instructions 210, the analysis and enforcement engines 230 (via interface 214) may also take other actions to prevent exploitation of a vulnerability. For a further example, in the case of lazy FPU state restore, the instrumented instructions 210 may change the BIOS setting to "eagerfpu=on". For another example, the instrumented instructions 210 may flush the data cache of the speculative engine on security domain transitions.

Prior to processes starting for execution, the analysis and enforcement engines 230 (via the AppSensors 239 in communication with file system monitor engine 236) computes checksum for the respective executables and libraries and compares the checksums against a signature database containing valid checksums for the process files. If the checksums do not match, the analysis and enforcement engines 230 may (via interface 214) terminate the process, move the process to a quarantine area, restore a valid copy of the process file, load one or more patches to remedy the process file, and report the process as malicious to the user.

The analysis and enforcement engines 230 (via the AppSensors 239 in communication with file system monitor engine 236) suspends processes and scans their respective process files as the processes are started for execution. The analysis and enforcement engines 230 check a scanned process file to identify whether a process includes a signature used in exploiting Spectre/Meltdown/Foreshadow/etc. vulnerabilities, such as a flushing of memory (e.g., data cache) used to process the application in the computing platform 200. If the process is identified to include such a signature, as the process executes, the analysis and enforcement analysis and enforcement engines 230 instrument instructions 210 to capture and analyze calls by the identified process. For example, through the instrumented instructions 210, the analysis and enforcement engines 230 (e.g., AppSensors 239 in communication with file system monitor engine 236) may analyze the captured call to detect whether the process executes the signature in accordance with a defined pattern (e.g., flushing at a certain frequency or speed, or reading a cache line for a particular variable faster than other cache lines). The defined pattern may be retrieved by the analysis and enforcement engines 230 from the AppMap 231 database. As the process executes, the instrumented instructions 10 may also monitor the process in real-time to determine if the process uses system/kernel registers (e.g., in Ring 0, such as CR0, CR1, CR2, CR3, etc.) with a privilege level instruction.

If the analysis and enforcement engines determine that the process execution meets the defined patterns or uses system/kernel register with a privileged level instruction, the analysis and enforcement engines 230 (e.g., via the control flow enforcement engine 133 over interface 214) terminate the process or take other protective actions in regard to the process. The analysis and enforcement analysis and enforcement engines 230 provide a deterministic mechanism to positively identify deviations caused by attacks on compiled code. These analysis and enforcement engines 230 protect the full application stack, including binary code, as well as code written in interpreted languages. The analysis and enforcement engines 230 execute techniques that enable thwarting exploits that take advantage of Spectre, Meltdown, Foreshadow and other vulnerabilities caused by speculative execution.

Figure 2B:
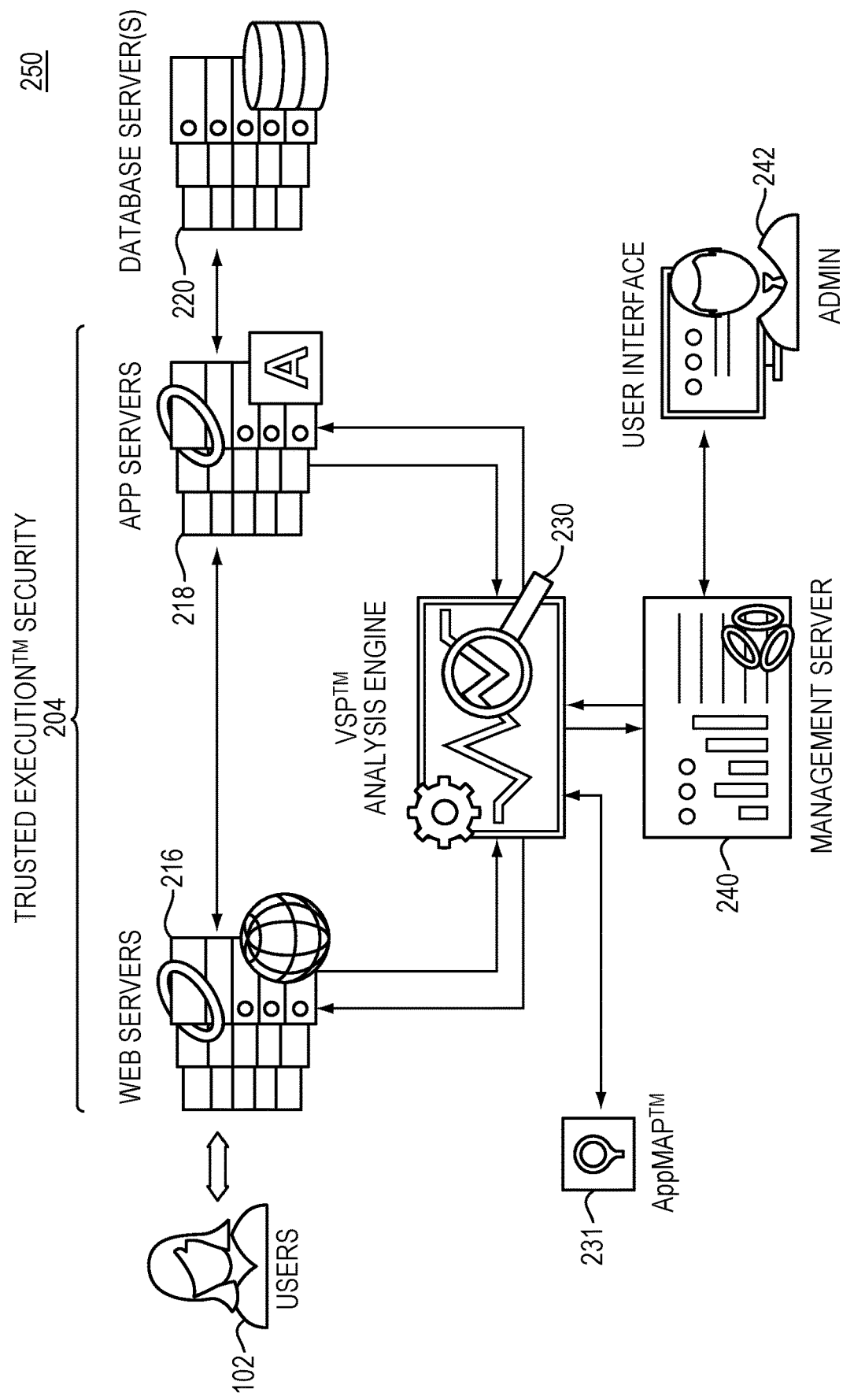
FIG. 2B illustrates another example trusted execution system for protecting an application from vulnerabilities in some embodiments of the present disclosure.

FIG. 2B illustrates another example trusted execution system 250 for protecting an application from vulnerabilities (Spectre, Meltdown, Foreshadow, and the like) present in one or more microprocessors executing an application. The system 250 of FIG. 1B executes the Analysis and Enforcement Engine (also referred to as the Virsec Security Platform (VSP) appliance) 230 to protect a web application infrastructure including the one or more microprocessors. In the web application infrastructure 204 of FIG. 1A, a web server 216 receives a web request (e.g., HTTP requests) from a user 202 (via a web service client). Using information included in the web request (e.g., URL), the web servers 216 authenticate the user 202, and if the authentication is successful, establishes a connection (or session) for the user 202 to engage in a service through the web application infrastructure 204. The application servers 218 handle application operations through the connection to provide the service to the user 202, including communicating with the database servers to access data 220.

One or more of the components of the web application infrastructure 204 (web servers 216, application servers 218, and database servers 220) may execute on the vulnerable one or more microprocessors that use speculative execution. While the web application infrastructure 204 is performing application operations, an attacker may attempt to exploit the vulnerabilities (Spectre, Meltdown, Foreshadow, and the like) of the one microprocessors caused by the speculative execution. The VSP appliance 230 of FIG. 2B implements fixes (patches) to the vulnerabilities as the code executes in memory of the microprocessor. See WO 2017/218872 A1 entitled "Systems and Methods for Remediating Memory Corruption in a Computer Application" for further information on the VSP appliance. To do so, the VSP appliance 230 dynamically analyzes the code (e.g., compiled code, binaries, and such) by AppSensors (analysis engine) as the code executes by the vulnerable one or more microprocessor of the web servers 216, application servers 218, and data servers 220. In some embodiments, the VSP appliance 230 may instrument functions or instructions (as part of a security monitor agent installed at the web infrastructure 204) between the main processor memory and CPUs of the microprocessors using a dynamic binary analysis engine.

As the application code executes on the microprocessor, the executed functions or instructions deterministically monitor the binary (or compiled code) of the application for instructions vulnerable to such exploits, such as out of bound access, branch target injection, and rogue data cache load. The monitored sequence of instructions may be instrumented from the AppMap 231 database, configured by an administrator through the user interface 242 of the management server 240 of the VSP appliance 230, and such. The VSP appliance 230 may apply rule-based policies based on security technical implementation guides (STIGS) or user configuration instrument particular instructions to monitor the application. In other embodiments, the VSP appliance 230 (e.g., via AppSensors) may statically analyze code of the application for such instructions prior to execution.

In response to detecting instructions vulnerable to such exploits, the VSP appliance 230 (via the instrumented instructions or security monitoring agent of VSP) may preemptively instrument protective instructions (patches) in real-time into the binary code, e.g., by a dynamic binary instrumentation engine executed by the security monitoring agent. The VSP appliance 230 instruments the protective instructions as the binary code is fetched from the main processor memory during execution of the application. For example, the VSP appliance 130 may instrument into the sequence of instructions a memory barrier instruction (e.g., fence instruction) that causes the speculative execution engine to enforce an ordering constraint on memory operations issued before and after the memory barrier instruction, thereby preventing out of bound access. For another example, the VSP appliance 230 may instrument direct call instructions in place of indirect jump calls, thereby preventing branch target injection where the attacker mis-trains a branch predictor to enable the attacker to choose a specific destination of an indirect jump call instruction during a speculative execution cycle. The VSP appliance 230 may also execute a thread that calculates the correct branch predictions in parallel to the branch predictors used in the speculative execution, and use the correct branch predictions to retrain the branch predictor against branch target injection exploits.

An attacker may exploit vulnerabilities caused by speculative execution by executing a malicious process that performs continued flushing of process memory assigned to the application in the web application infrastructure 204. The VSP appliance 230 of FIG. 1B monitors for such malicious processes in the web application infrastructure 204. To do so, the VSP appliance 230 (e.g., AppSensors components) may scan a process file as the process is started for execution. The VSP appliance 230 computes a checksum for the respective process file (e.g., Microsoft application files) and compares the checksums against a signature database containing valid checksums for the process files. If the checksums do not match, the VSP appliance 230 may terminate the process, move the process to a quarantine area, restore a valid copy of the process file, load one or more patches to remedy the process file, and report the process as malicious to the user.

Further, during the scanning, the VSP appliance 230 identifies whether the process includes a signature of flushing memory. If the process is identified to include such a signature, as the process executes, the executed functions or instructions of the VSP appliance 230 deterministically monitor the process in real-time to detect if the process executes the signature in accordance with a defined pattern (e.g., flushing at a certain frequency or speed, or reading a cache line for a particular variable faster than other cache lines). The defined pattern may be retrieved from the App-Map 231 database, configured by an administrator through the user interface 142 of the management server 240 of the VSP appliance 230, and such. As the process executes, the VSP appliance 230 also monitors the process in real-time to determine if the process uses system/kernel registers (e.g., in Ring 0, such as CR0, CR1, CR2, CR3, etc.) with a privilege level instruction.

If the process meets the defined pattern or uses privilege level instructions in system/kernel registers, the VSP appliance 230 determines that the process is a malicious process attempting to exploit vulnerabilities of speculative execution, and takes a protective in the web application infrastructure. In other embodiments, the protective action may include terminating the process, moving the process to a quarantine area, restoring a valid copy of the process file, loading one or more patches to remedy the process file, and reporting the process as malicious to the user.

Methods for Defending Against Malicious Speculative Execution

Figure 3A:
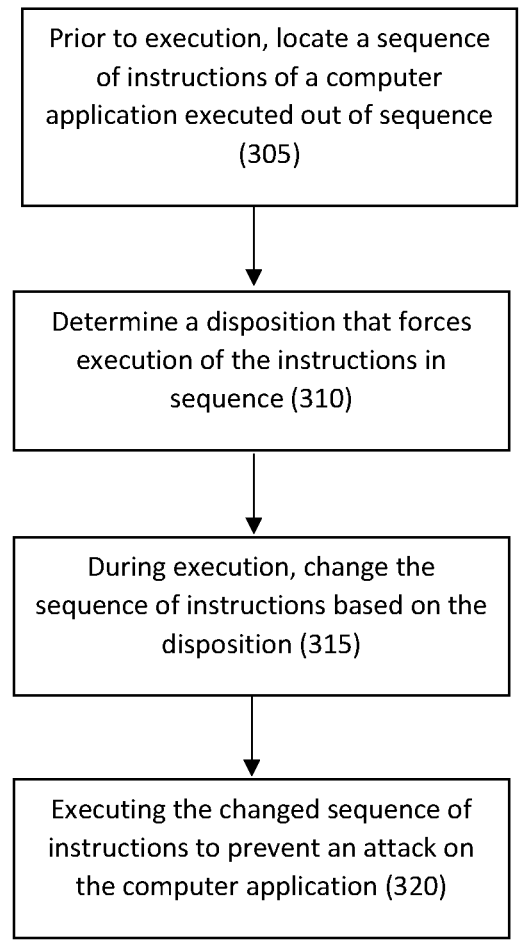
FIG. 3A illustrates an example method of virtually patching vulnerabilities in some embodiments of the present disclosure.

FIG. 3A illustrates an example method 300 of virtually patching Spectre/Meldown/Foreshadow vulnerabilities of a computer application. In example embodiments, the analysis and enforcement engines (VSP appliance) 130 of FIGS. 1A and 1B execute the method 300.

Prior to execution of a computer application by a speculative execution engine, the method 300 locates 305 a sequence of instructions of the computer application that the speculative execution engine executes out of sequence. In some embodiments, the method 300 may locate the sequence of instructions by dynamically analyzing the application code (e.g., using a binary analysis engine), as the speculative execution engine dispatches the code from the process memory of the computer application or instruction/code cache toward a central processing unit (CPU) for execution. The dynamic analysis described with reference to FIG. 1A or FIG. 1B may be used by method 300. In other embodiments, the method 300 may locate and identify the sequence of instructions prior to execution of the application, such as scanning the process file of the application.

The speculative execution engine may be a microprocessor, including certain processors by Intel, AMD, and ARM, that use speculative execution to execute code of computer applications. The speculative execution engine may be configured with an architecture similar to FIG. 2A. The out of sequence execute may causes Spectre vulnerabilies, Meltdown vulnerabilities, Foreshadow vulnerabilities, or other vulnerabilities that may be exploited by a malicious attacker to gain access to secure data. In some embodiments, the method 300 may determine that the sequence of instruction is one that the speculative execution engine executes out of sequence by consulting a database or other memory defining such sequences of instructions. In some embodiments, the method 300 may determine the sequence of instructions through machine learning of execution patterns of the speculative execution engine. In example embodiments, the sequence of instruction comprises a repeat string operation that includes one of assembly code repeat instructions: REP, REPNZ, and REPZ. The repeat string operation may comprise an "if-then-else" code block. The method may also locate indirect branch instructions of the computer application.

The method 300 determines 310 a disposition to the sequence of instructions that forces the speculative execution engine to execute the instructions in sequence. In some embodiments, the method 300 may determine the disposition as the speculative execution engine dispatches the code from the instruction cache toward the central processing unit (CPU) for execution. In other embodiments, the method 300 may locate and identify the disposition prior to execution of the application, such as scanning the process file of the application. In some embodiments, the method 300 may determine the disposition by consulting a database or other memory that maps an identified sequence of instructions executed out of sequence to an appropriate disposition for that identified sequence. In some embodiments, the method 300 may determine the disposition for a sequence of instructions through machine learning of execution patterns of the speculative execution engine. In some embodiments, the disposition may include adding to the sequence of instructions a memory barrier instruction that causes the speculative execution engine to enforce an ordering constraint on memory operations issued before and after the memory barrier instruction. Such a memory barrier instruction may include one of assembly code instructions LFENCE, MFENCE, SSBB, or CSDB.

During execution of the computer application by the speculative execution engine, the method 300 changes 315 the sequence of instructions based on the disposition (e.g., applies a virtual patch). The method 300, at step 320, executes the changed sequence in place of the originally located sequence of instructs to prevent an attack on the computer application by exploiting this vulnerability. In some embodiments, the method 300 (steps 315 and 320) may change the sequence of instructions as the speculative execution engine dispatches the code from the instruction cache toward the central processing unit (CPU) for execution. For example, the method 300 may use a binary instrumentation engine to dynamically change the sequence of instructions prior to execution by the CPU. The dynamic instrumentation of instructions described with reference to FIG. 1A or FIG. 1B may be used by method 300. The method executes 320 the changed sequence of instructions to prevent an attack on the computer application.

Similarly, during execution of the computer application, the method 300 may also change the located indirect branch instructions to direct branch instructions. The method 300 may executing the direct branch instructions in place of the located indirect branch instructions to prevent an attack on the computer application. The method may further retrain the branch predictor of the speculative execution engine to prevent branch target injection using indirect branch instructions.

Figure 3B:
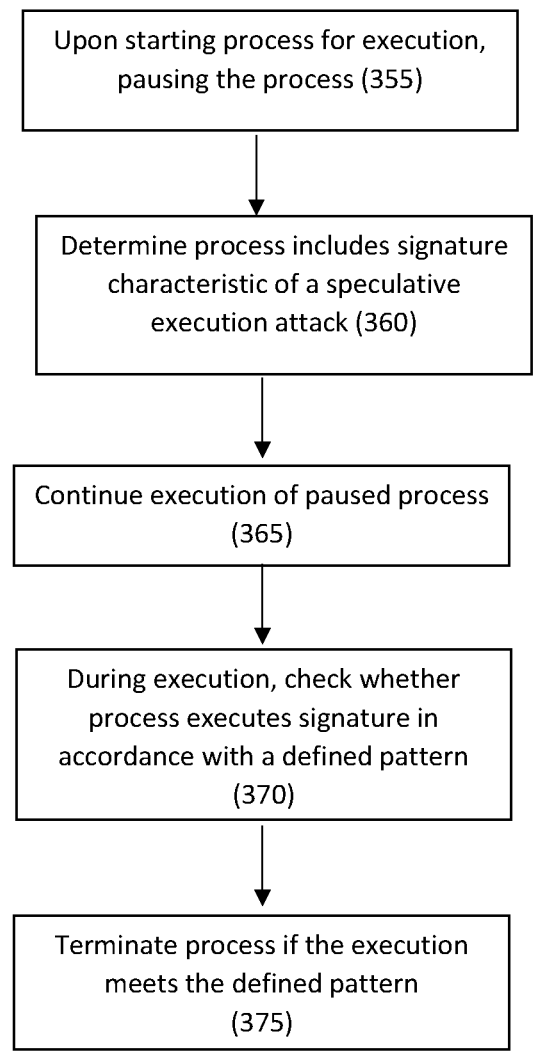
FIG. 3B illustrates an example method of detecting and preventing exploitations in some embodiments of the present disclosure.

FIG. 3B illustrates an example method of detecting and preventing Spectre/Meldown/Foreshadow exploitations in some embodiments of the present disclosure. In example embodiments, the VSP appliance of FIG. 1A or the analysis and enforcement engines 130 of FIG. 1B execute the method 350.

Upon a process being started for execution, the method 350 suspends 355 the execution of the process. The method 350 then determines 360 whether the suspended process includes a signature characteristic of a speculative execution attack. For example, an attacker may exploit speculative execution vulnerabilities (e.g., Spectre, Meltdown, Foreshadow, and the like) by executing a malicious process that performs continued flushing of process memory (e.g., data cache) used in executing code of a computer application. The method 350 may scan the process file and determine that the suspended process includes such a signature of flushing memory. The signature of flushing memory may include CLFLUSH, MCR, and RDTSC assembly instructions. The method then continues 365 execution of the suspended process. Based on determining the process includes the signature, the method 350 identifies the process to be checked during execution for behavior characteristic of exploiting speculative execution vulnerabilities.

During the execution, the method 350 checks 370 whether the process executes the signature in accordance with a defined pattern. For example, the method 350 may check whether the process calls CLFLUSH, MCR, and RDTSC assembly instructions to flush memory (e.g., data cache) associated with an executing application at a frequency, speed, order, and such indicating exploitation of the speculative execution vulnerabilities. In some embodiments, the method 350 may determine the defined pattern by consulting a database or other memory that stores flush patterns characteristic of such exploitation. In some embodiments, the method 300 may determine the defined pattern through machine learning of execution patterns of malicious process exploiting speculative execution vulnerabilities. In some embodiments, the method 350 dynamically analyzing the process, as the process executes, to check whether the process executes the signature in accordance with the defined pattern. The dynamic analysis described with reference to FIG. 1A or FIG. 1B may be used by method 350. The method 350 terminates 375 the process if the execution meets the defined pattern.

Example Protection Scenario

Figure 4A:
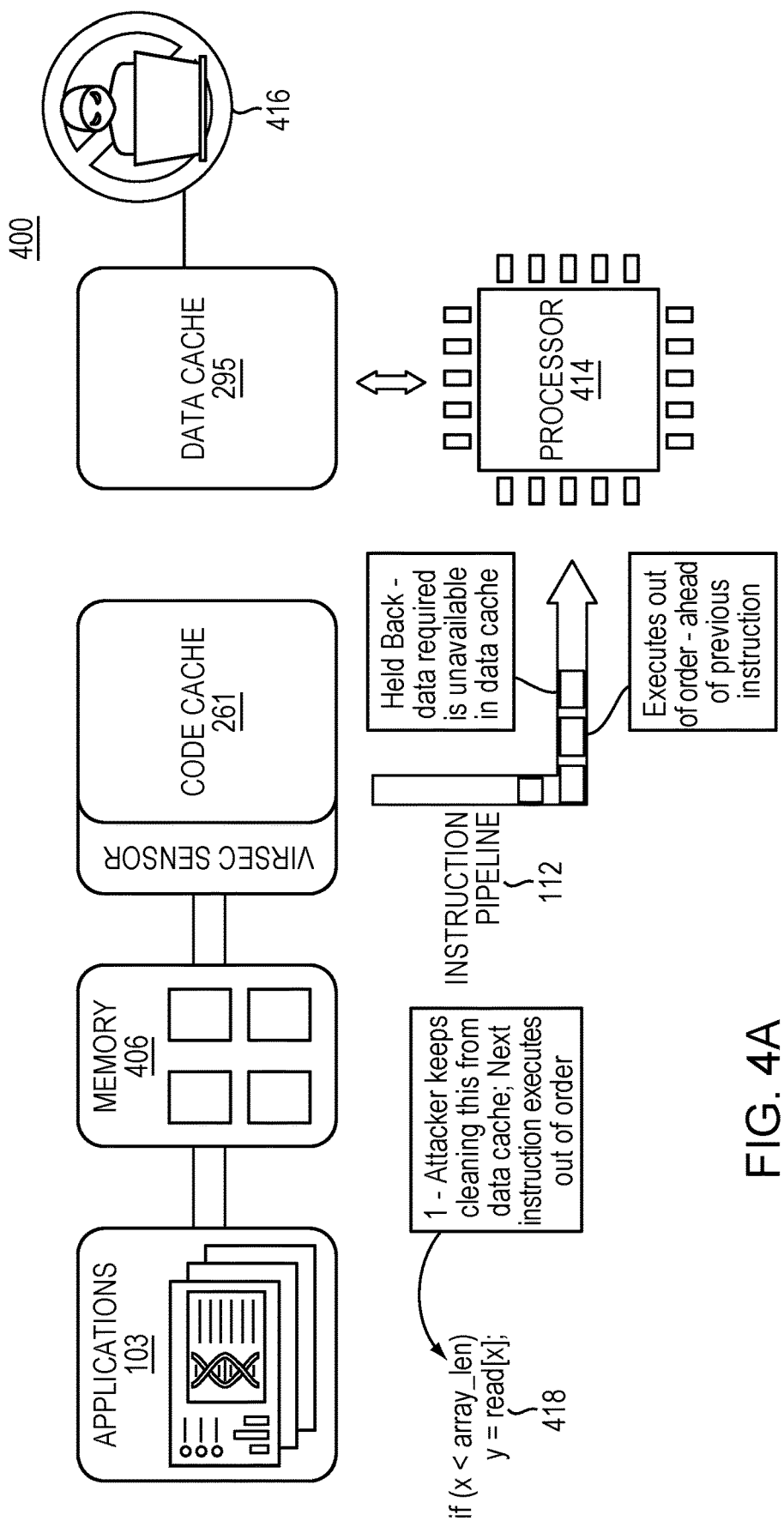
FIG. 4A illustrates an example scenario of an attacker exploiting vulnerabilities caused by speculative execution.

FIG. 4A illustrates an example scenario 400 of an attacker exploiting vulnerabilities (Spectre variant 1—bound check bypass) caused by speculative execution. In FIG. 4A, applications are executed on a platform that includes the files 103 of applications and process memory 406 assigned to the applications. The platform also includes a speculative execution engine, including the code cache 261, data cache 295, instruction pipeline 112, and processor (CPU) 414. In the example scenario 400 of FIG. 4A, an application process is executed from its file 103 and loaded into process memory 406. The application process includes the instructions of an "if-then" code block 418. As the application is being executed by the speculative execution engine, the instructions of the "if-then" code block 418 are moved from process memory 406 to the code cache 261 of the speculative execution engine. The speculative execution engine then fetches each instruction from the code cache 261, into the instruction pipeline 112, and the processor 414 for execution.

The speculative execution engine reorders the execution of the instructions in the instruction pipeline 112, such that a later instruction executes out of order ahead of a previous instruction. For example, the "then" instructions of the "if-then" code block 118 ("y=read[x]") may be executed prior to the "if" instruction of the code block 118 ("if (x<array_len)"). In FIG. 4A, the speculative execution engine reorders the previous instruction (e.g., "if (x<array_len)") because the previous instruction requires data for execution that is not yet available in the data cache 295 from the main memory of the speculative execution engine. For example, the "array_len" value is not yet available in the data cache 295. The previous instruction (e.g., "if (x<array_len)") is be placed in a reorder buffer until the data (e.g., "array_len" value) is available in the data cache to execute the previous instruction.

To continue to prevent execution of the previous instruction (e.g., "if (x<array_len)"), an attacker 416 repeatedly clears the data from the data cache, such as by using a cache flush instruction (CLFLUSH or MCR) and accurate timing instruction (RDTSC). Due to the repeated clearing, the previous instruction continues to wait in the reorder buffer since the data (e.g., "array_len") continues to be unavailable. During this time, the attacker 216 can locate and control variables of the later instructions of the code block 418 (e.g., "x") to gain unauthorized visibility into the mapping of the application memory (e.g., how values of "x" maps to values of "y"). Through the unauthorized visibility, the attacker 216 can gain access to private data (e.g., credit card numbers) processed by the application.

Figure 4B:
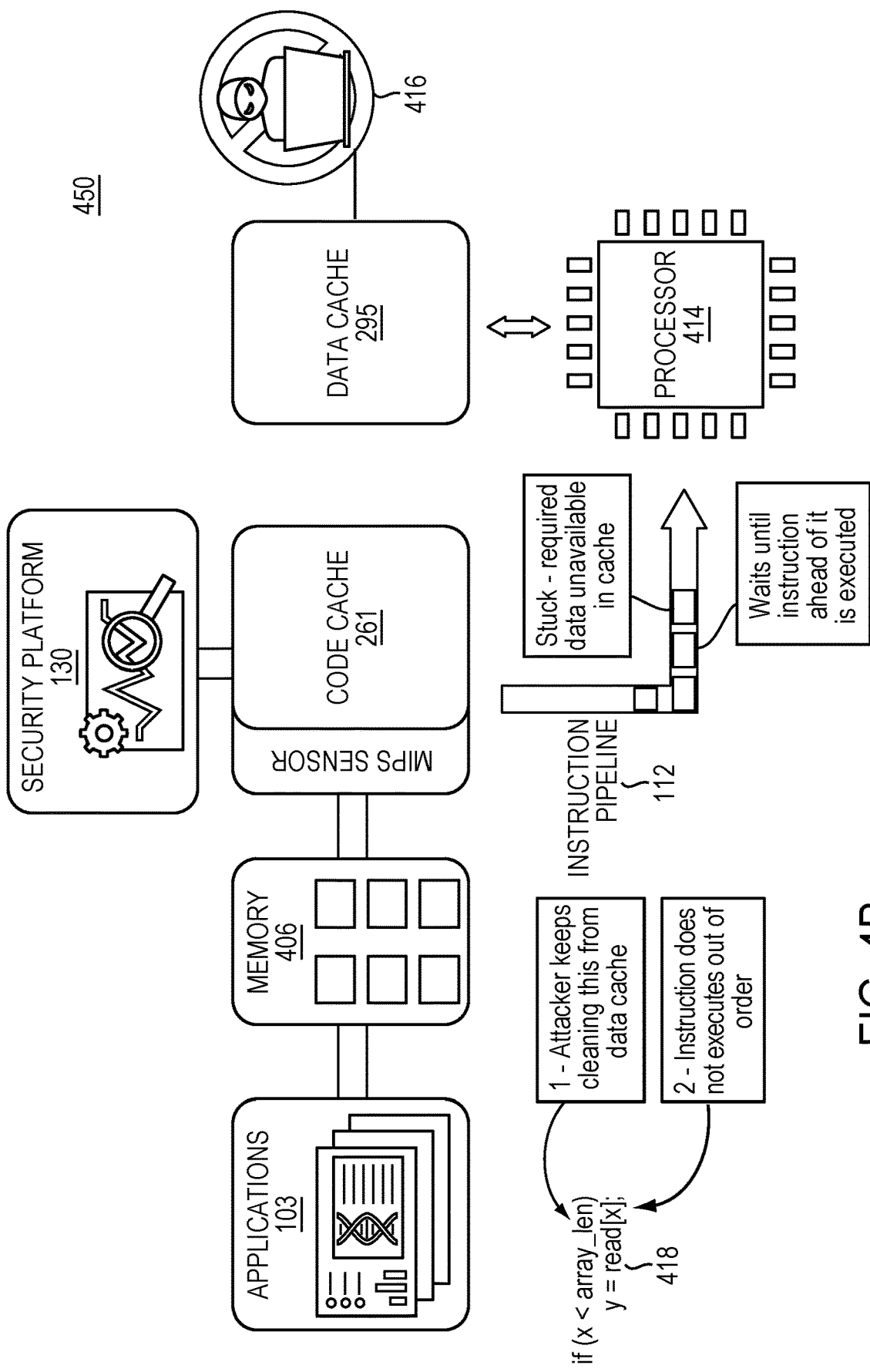
FIG. 4B illustrates an example scenario of preventing the attacker from exploiting vulnerabilities caused by speculative execution in some embodiments of the present disclosure.

FIG. 4B illustrates an example scenario of preventing the attacker from exploiting vulnerabilities caused by speculative execution in some embodiments of the present disclosure. In FIG. 2B, the security platform 130 of embodiments of the present invention instrument instructions into the platform, such the instrumented instructions detect code blocks that will be reordered by the speculative execution engine (e.g., code block 418) as the instructions of the code block are being dispatched from the process memory 406 or code cache 261 toward the instruction pipeline 112 to the processor 414. Using the instrumented instructions, as the application code is fetched from process memory 406 or code cache 261 and transmitted to the instruction pipeline 112, the security platform 130 inserts appropriate instructions into the code block to prevent the reordering of execution of the instructions. For example, in the case of the "if-then" code block 418, the security platform 130 inserts to the sequence of instructions a memory barrier instruction (e.g., fence instruction) that causes the speculative execution engine to enforce an ordering constraint on memory operations issued before and after the memory barrier instruction. Examples of such an added memory barrier instruction includes assembly instructions LFENCE, MFENCE, SSBB, or CSDB.

With the inserted instruction, the speculative execution engine cannot reorder the execution of the instructions in the instruction pipeline 112. Thus, the speculative execution engine must wait to execute a later instruction until the previous instruction ahead of the later instruction is executed. As such, if a previous instruction (e.g., "if (x<array_len)") requires data for execution that is not yet available in the data cache 295 from the main memory of the speculative execution engine, the later instruction is stuck waiting in the pipeline until the data is available. For example, the "array_len" value is not yet available in the data cache 295. Thus, the instruction including this variable (e.g., "if (x<array_len)") waits in the instruction pipeline 112 for execution, and the other instructions in the code block after this instruction (e.g., ("y=read[x]") also wait in the instruction pipeline 112 for execution following this instruction.

If an attacker 416 repeatedly clears the data from the data cache, such as by using a cache flush instruction (CLFLUSH) and accurate timing instruction (RDTSC), the instructions of the code block are not executed out of order. Thus, the attacker 416 is not provided a vulnerability to exploit to locate and control variables of the later instructions of the code block 418 (e.g., "x") to gain unauthorized visibility into the mapping of the application memory (e.g., how values of "x" maps to values of "y").

Further, the security platform 130 may instrument instructions to check the behavior of processes determined to include cache flush instruction (CLFLUSH) and accurate timing instruction (RDTSC). The security platform 130 may determine such processes by scanning the file of the process when they are started. As the application executes, if one of these processes flush the data cache 295 according to defined patterns (e.g., frequency, speed, etc.), the security platform 130 may identify the process as a malicious process of an attacker 416 and terminate the process.

Figure 5:
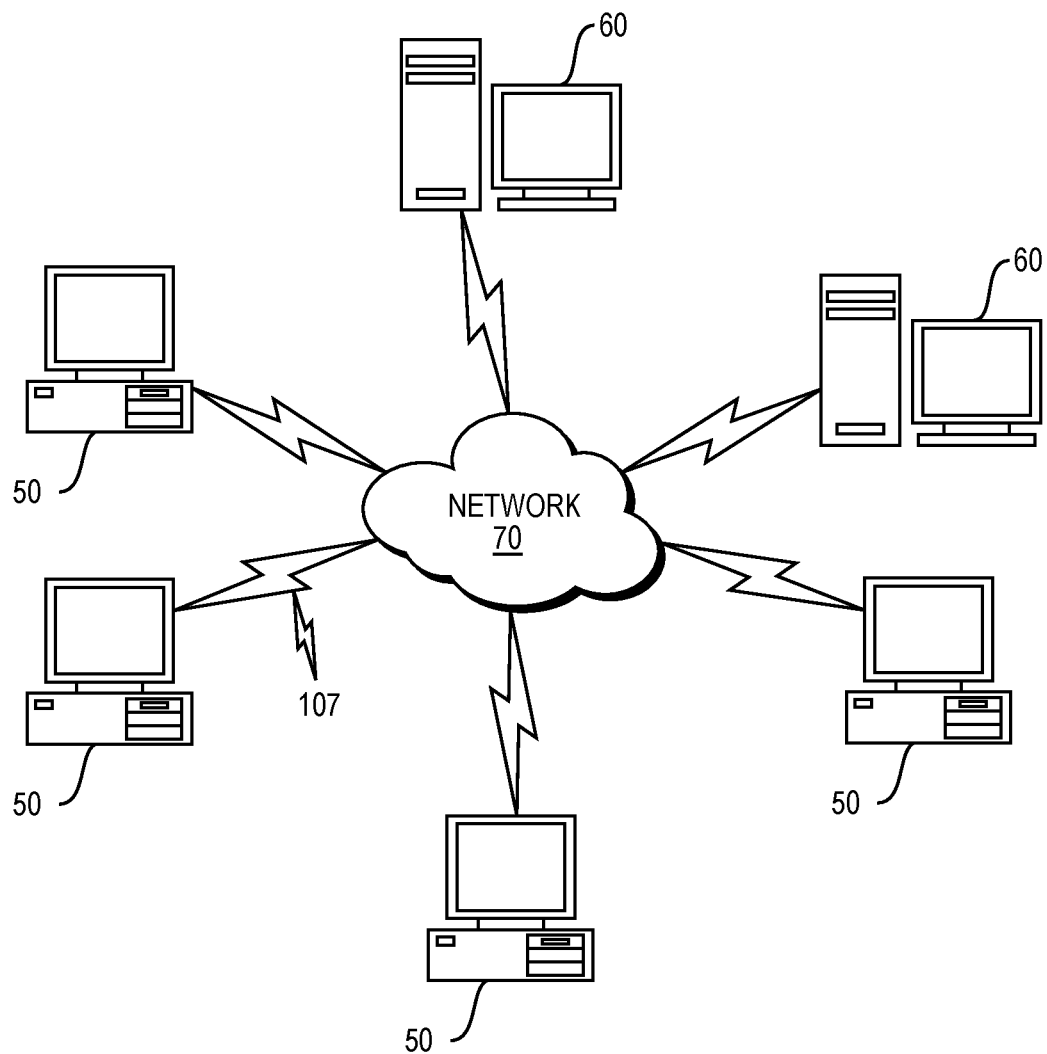
FIG. 5 illustrates a computer network or similar digital processing environment in which embodiments of the present disclosure may be implemented.

FIG. 5 illustrates a computer network or similar digital processing environment in which embodiments of the present disclosure may be implemented.

Client computer(s)/devices 50 and server computer(s) 60 provide processing, storage, and input/output devices executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Client computers/devices 50 may be configured as a security monitoring agent of the VSP appliance. Server computers 60 may be configured as an analysis engine or AppSensor of the VSP appliance which communicates with client devices (i.e., security monitoring agents) 50 for detecting database injection attacks. The server computers 60 may not be separate server computers but part of cloud network 70. In some embodiments, the server computer may analyze a set of computer instructions, identify one or more dispositions (patches) to be applied, and apply one or more patches to the computer instructions. The client (security monitoring agent) 50 may communicate patches and patch requests, to/from the server (analysis engine or AppSensor) 60. In some embodiments, the client 50 may include client applications or components executing on the client (e.g., security monitoring agent) 50 for capturing requests and queries, and detecting speculative execution vulnerabilities for which patches are required, as well as providing patches, and the client 50 may communicate this information to the server (e.g., analysis engine) 60.

Figure 6:
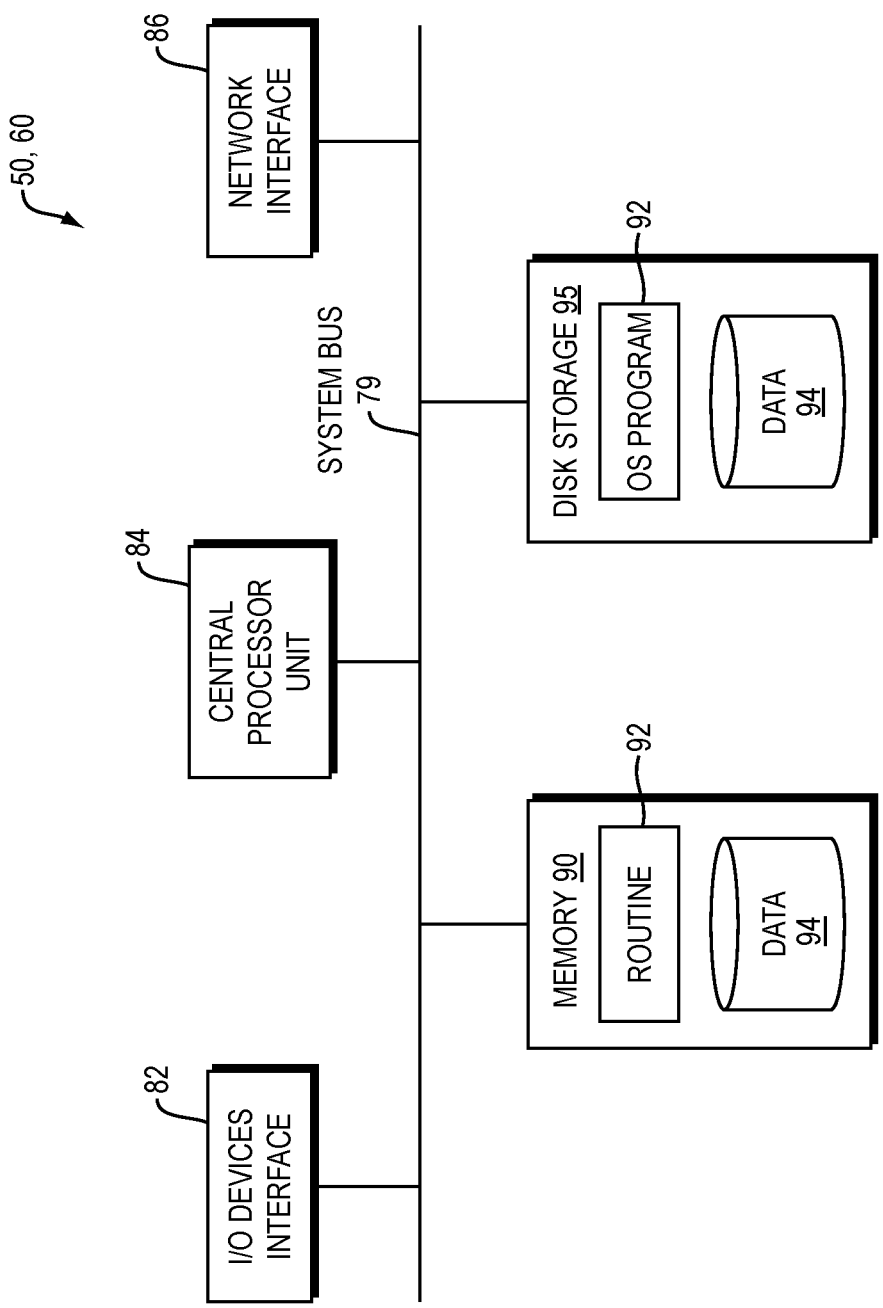
FIG. 6 illustrates a diagram of an example internal structure of a computer (e.g., client processor/device or server computers) in the computer system of FIG. 5.

FIG. 6 is a diagram of an example internal structure of a computer (e.g., client processor/device 50 or server computers 60) in the computer system of FIG. 5. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an I/O device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 8). Memory 90 provides volatile storage for computer software instructions 92 and data 94 used to implement an embodiment of the present disclosure (e.g., apply dispositions or patches to application code vulnerable due to speculative execution). Disk storage 95 provides non-volatile storage for computer software instructions 92 and data 94 used to implement an embodiment of the present disclosure. A central processor unit 84 is also attached to the system bus 79 and provides for the execution of computer instructions.

Embodiments or aspects thereof may be implemented in the form of hardware including but not limited to hardware circuitry, firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, hardware, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

While example embodiments have been particularly shown and described, it will be understood by those skilled in the art that various changes in form and details may be made therein without departing from the scope of the embodiments encompassed by the appended claims.

What is claimed is:

1. A computer-implemented method comprising:
 (i) prior to execution of a computer application by a speculative execution engine:
  locating instructions of a sequence of instructions of the computer application in which (i) the located instructions of the sequence are to be executed and (ii) the speculative execution engine executes the located instructions out of order, and
  determining a disposition to the sequence of instructions that forces the speculative execution engine to execute the located instructions in order; and
 (ii) prior to executing the located instructions out of order and during execution of the computer application by the speculative execution engine:
  changing the sequence of instructions based on the disposition to execute the located instructions in order, and
  executing the changed sequence of instructions to prevent an attack on the computer application.

2. The method of claim 1, wherein the sequence of instructions comprises a repeat string operation.

3. The method of claim 2, wherein the repeat string operation include one of assembly code repeat instructions: REP, REPNZ, and REPZ.

4. The method of claim 2, wherein the repeat string operation comprises an if-then-else code block.

5. The method of claim 1, wherein the disposition includes adding to the sequence of instructions a memory barrier instruction that causes the speculative execution engine to enforce an ordering constraint on memory operations issued before and after the memory barrier instruction.

6. The method of claim 5, wherein the memory barrier instruction is one of assembly code instructions: LFENCE, MFENCE, SSBB, or CSDB.

7. The method of claim 5, further comprising reporting a jump to an added memory barrier instruction to a user as a potential attack.

8. The method of claim 1, further comprising:
 (i) prior to execution of the computer application by the speculative execution engine:
  detecting a mis-trained branch predictor of the speculative execution engine, the mis-trained branch predictor computing incorrect branch predictions that enables exploiting indirect branch instructions, and
  based on the detection of the mis-trained branch predictor, locating indirect branch instructions of the computer application; and
 (ii) during execution of the computer application by the speculative execution engine:
  changing the located indirect branch instructions to direct branch instructions, and
  executing the direct branch instructions in place of the located indirect branch instructions to prevent an attack on the computer application.

9. The method of claim 8, further comprising:
 calculating correct branch predictions in parallel to the mis-trained branch predictor, and
 using the calculated correct branch predictions to retrain the mis-trained branch predictor.

10. A computer system comprising:
 a processor coupled to computer memory, the processor configured to:
  (i) prior to execution of a computer application by a speculative execution engine:
   locate instructions of a sequence of instructions of the computer application in which (i) the located instructions of the sequence are to be executed and (ii) the speculative execution engine executes the located instructions out of order, and
   determine a disposition to the sequence of instructions that forces the speculative execution engine to execute the located instructions in order; and
  (ii) prior to executing the located instructions out of order and during execution of the computer application by the speculative execution engine:

change the sequence of instructions based on the disposition to execute the located instructions in order, and execute the changed sequence of instructions to prevent an attack on the computer application.

11. The system of claim 10, wherein the sequence of instructions comprises a repeat string operation.

12. The system of claim 11, wherein the repeat string operation include one of assembly code repeat instructions: REP, REPNZ, and REPZ.

13. The system of claim 11, wherein the repeat string operation comprises an if-then-else code block.

14. The system of claim 10, wherein the disposition includes adding to the sequence of instructions a memory barrier instruction that causes the speculative execution engine to enforce an ordering constraint on memory operations issued before and after the memory barrier instruction.

15. The system of claim 14, wherein the memory barrier instruction is one of assembly code instructions: LFENCE, MFENCE, SSBB, or CSDB.

16. The system of claim 14, the processor is further configured to report a jump to an added memory barrier instruction to a user as a potential attack.

17. The system of claim 10, wherein the processor is further configured to:

(i) prior to execution of the computer application by the speculative execution engine:

detect a mis-trained branch predictor of the speculative execution engine, the mis-trained branch predictor computing incorrect branch predictions that enables exploiting indirect branch instructions, and based on the detection of the mis-trained branch predictor, locate indirect branch instructions of the computer application; and (ii) during execution of the computer application by the speculative execution engine:

change the located indirect branch instructions to direct branch instructions, and execute the direct branch instructions in place of the located indirect branch instructions to prevent an attack on the computer application.

18. The system of claim 17, wherein the processor is further configured to:

calculate correct branch predictions in parallel to the mis-trained branch predictor, and use the calculated correct branch predictions to retrain the mis-trained branch predictor.

* * * * *